(12) United States Patent
Horn

(10) Patent No.: US 11,885,881 B2
(45) Date of Patent: Jan. 30, 2024

(54) SENSOR SYSTEM FOR A ROAD FINISHING MACHINE

(71) Applicant: MOBA Mobile Automation AG, Limburg (DE)

(72) Inventor: Alfons Horn, Limburg (DE)

(73) Assignee: MOBA Mobile Automation AG, Limburg (DE)

(*) Notice: Subject to any disclaimer, the term of this patent is extended or adjusted under 35 U.S.C. 154(b) by 87 days.

(21) Appl. No.: 17/240,924

(22) Filed: Apr. 26, 2021

(65) Prior Publication Data

US 2021/0247514 A1     Aug. 12, 2021

Related U.S. Application Data

(63) Continuation of application No. PCT/EP2018/080045, filed on Nov. 2, 2018.

(51) Int. Cl.
| | |
|---|---|
| *G01S 17/42* | (2006.01) |
| *E01C 19/48* | (2006.01) |
| *E01C 23/01* | (2006.01) |
| *G05D 1/02* | (2020.01) |

(52) U.S. Cl.
CPC .............. *G01S 17/42* (2013.01); *E01C 19/48* (2013.01); *E01C 23/01* (2013.01); *G05D 1/0236* (2013.01)

(58) Field of Classification Search
CPC .......... E01C 19/48; E01C 23/01; G01S 17/42; G05D 1/0236
USPC ................................................ 404/84.05–118
See application file for complete search history.

(56) References Cited

U.S. PATENT DOCUMENTS

| | | | |
|---|---|---|---|
| 4,647,784 A | 3/1987 | Stephens | |
| 5,327,345 A | 7/1994 | Nielsen et al. | |
| 8,794,868 B2* | 8/2014 | Fritz | E01C 19/48 |
| | | | 404/84.5 |
| 9,587,937 B2 | 3/2017 | Buschmann et al. | |
| 2004/0068896 A1* | 4/2004 | Sehr | E01C 19/006 |
| | | | 37/413 |
| 2017/0160094 A1* | 6/2017 | Zhang | B60R 11/00 |

(Continued)

FOREIGN PATENT DOCUMENTS

| | | |
|---|---|---|
| CA | 2832956 C | 11/2016 |
| CN | 103492967 A | 1/2014 |

(Continued)

*Primary Examiner* — Raymond W Addie
(74) *Attorney, Agent, or Firm* — Perkins Coie LLP; Michael A. Glenn

(57) ABSTRACT

A sensor system for a construction machine, in particular a road finishing machine, includes a laser scanner and an evaluation unit. The laser scanner can be arranged on the construction machine or the road finishing machine itself and is configured to search a specified angular range for objects and to determine angles of the specified angular range according to distance values describing the distance to the one or several objects together with corresponding intensity values describing an intensity of a reflection resulting at the one or several objects. The evaluation unit is configured to detect an object as a reference together with corresponding angles based on a known pattern including the distance values and the intensity values across the angles. Further, the evaluation unit is configured to determine a distance to the reference and/or an angle with respect to the reference.

25 Claims, 21 Drawing Sheets

(56) References Cited

U.S. PATENT DOCUMENTS

| | | | |
|---|---|---|---|
| 2018/0164829 A1 | 6/2018 | Oshima et al. | |
| 2018/0237999 A1* | 8/2018 | Højland | E01C 19/4873 |
| 2019/0119865 A1* | 4/2019 | Weber | E01C 19/008 |

FOREIGN PATENT DOCUMENTS

| | | |
|---|---|---|
| CN | 108235712 A | 6/2018 |
| DE | 4204481 A1 | 10/1992 |
| DE | 69411794 T2 | 8/1998 |
| DE | 19755324 A1 | 6/1999 |
| DE | 19951296 A1 | 6/2001 |
| DE | 10060903 A1 | 7/2002 |
| DE | 10138563 A1 | 2/2003 |
| DE | 102011113752 A1 | 3/2013 |
| EP | 1118713 A1 | 7/2001 |
| JP | 2013231354 A | 11/2013 |
| WO | 2012140191 A1 | 10/2012 |

* cited by examiner

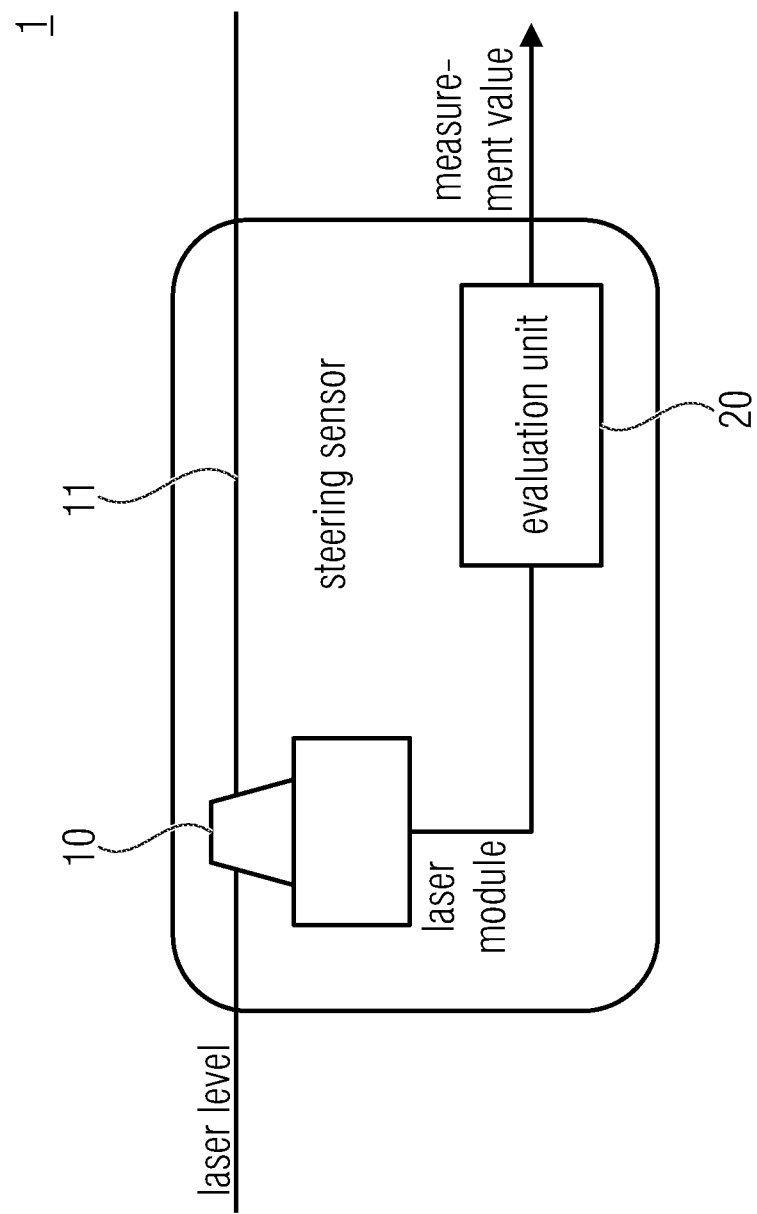

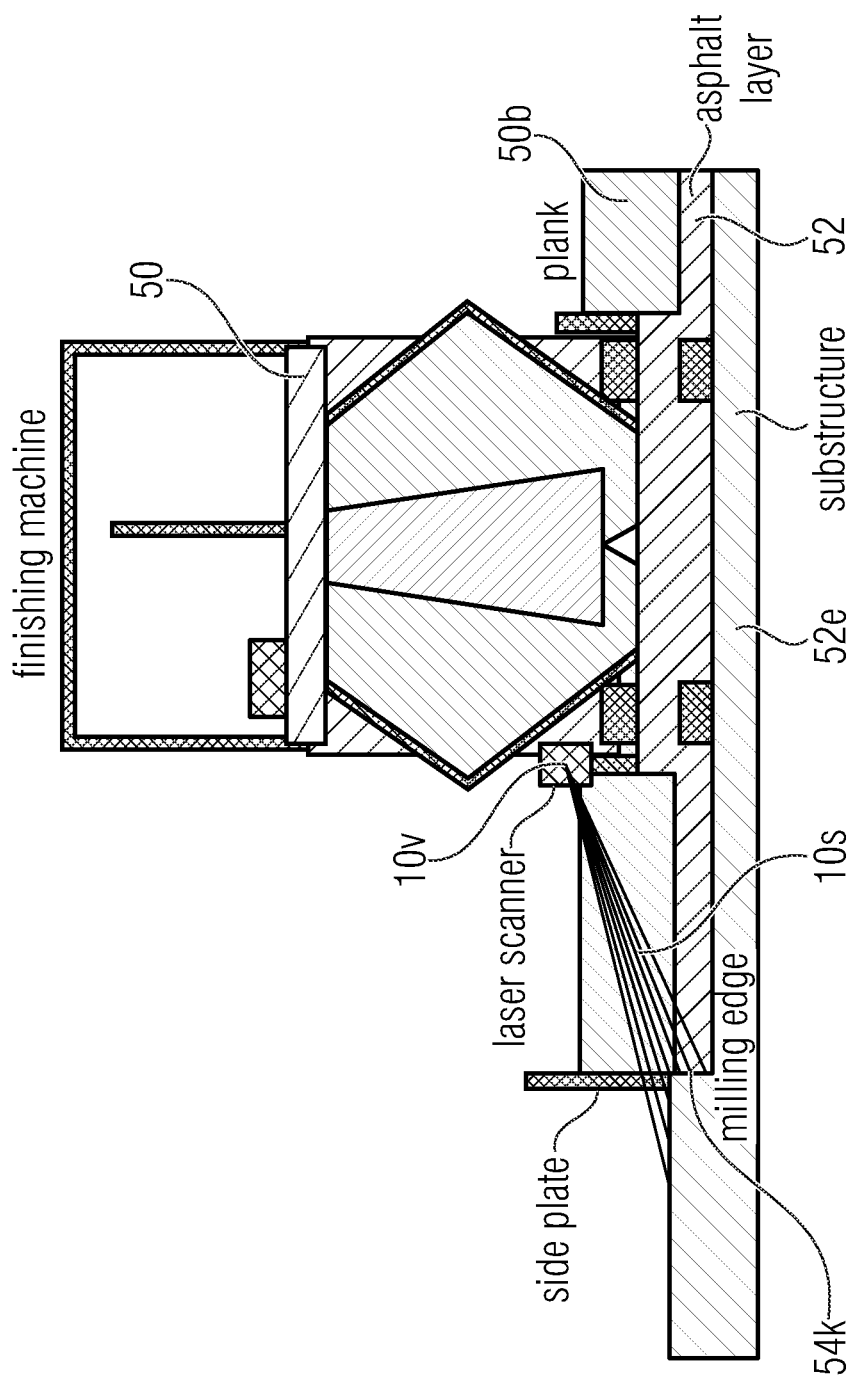

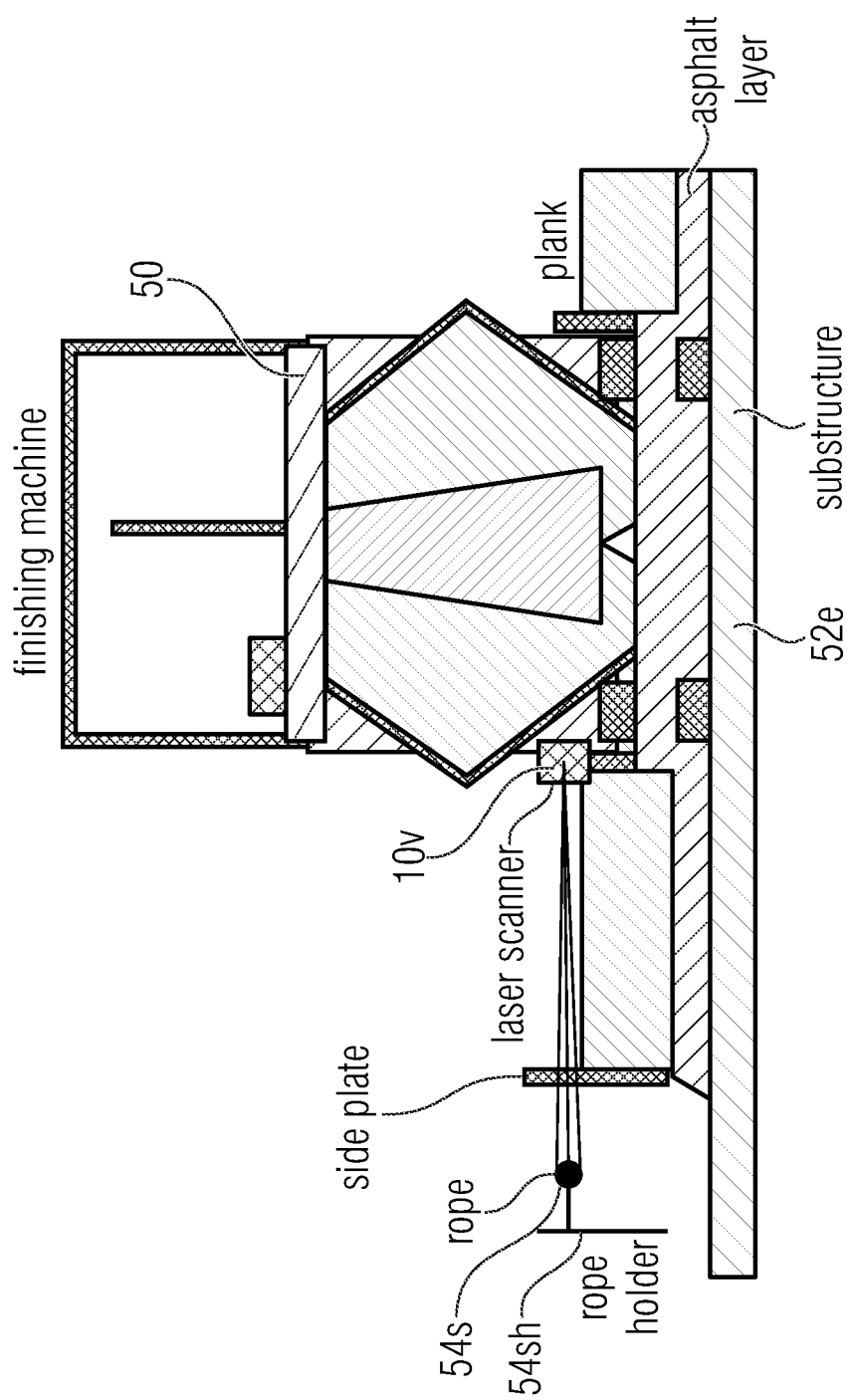

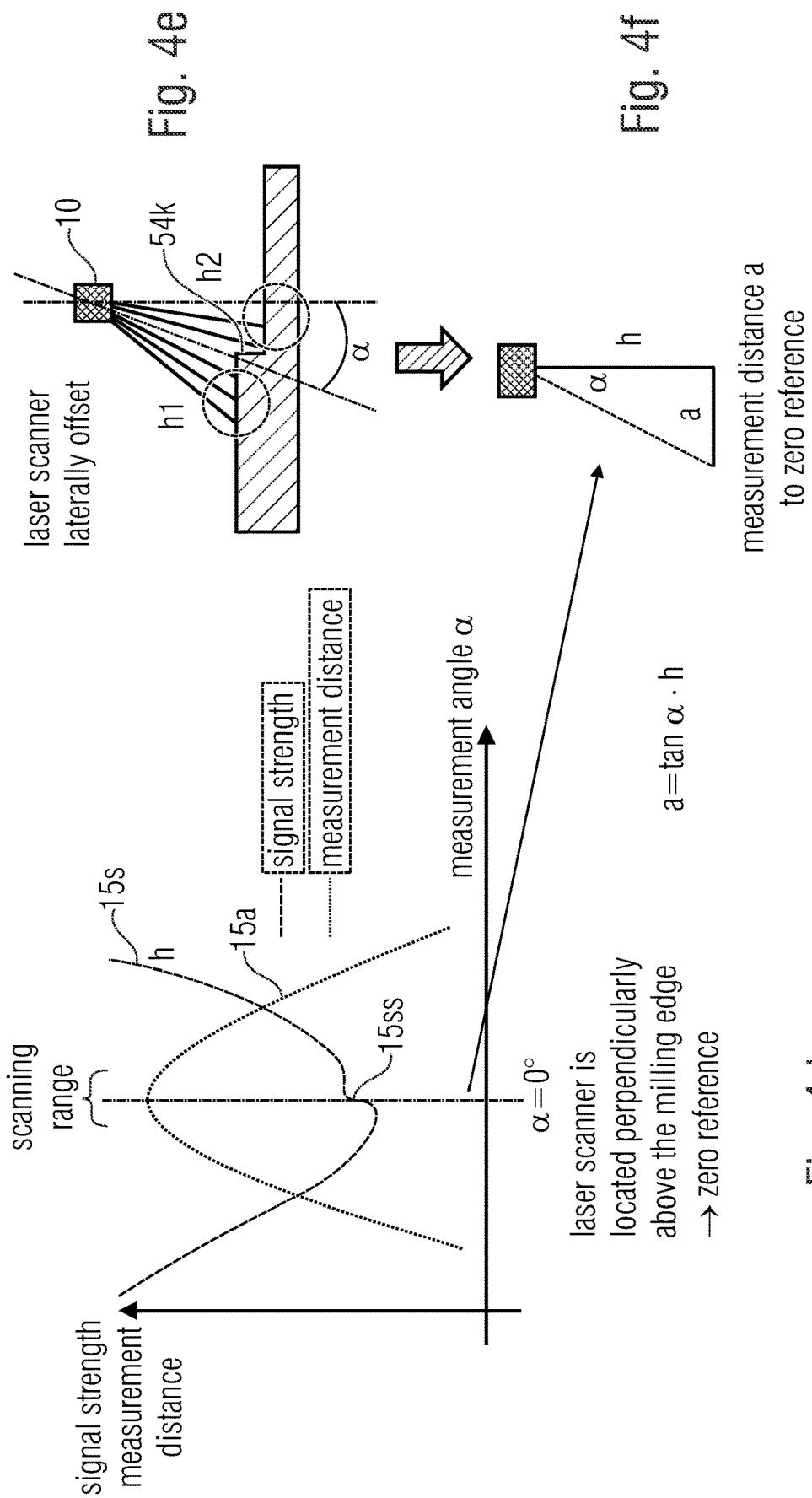

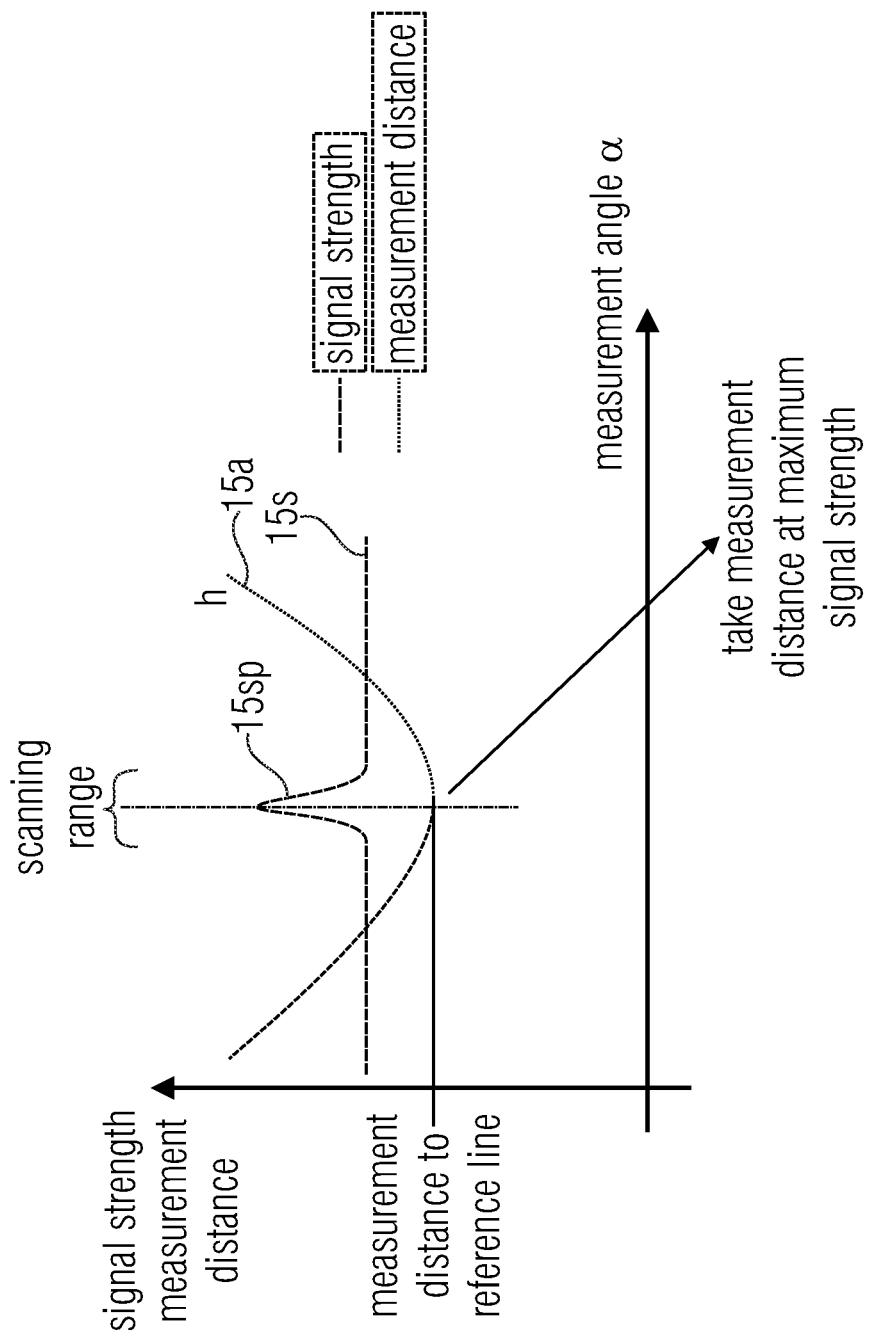

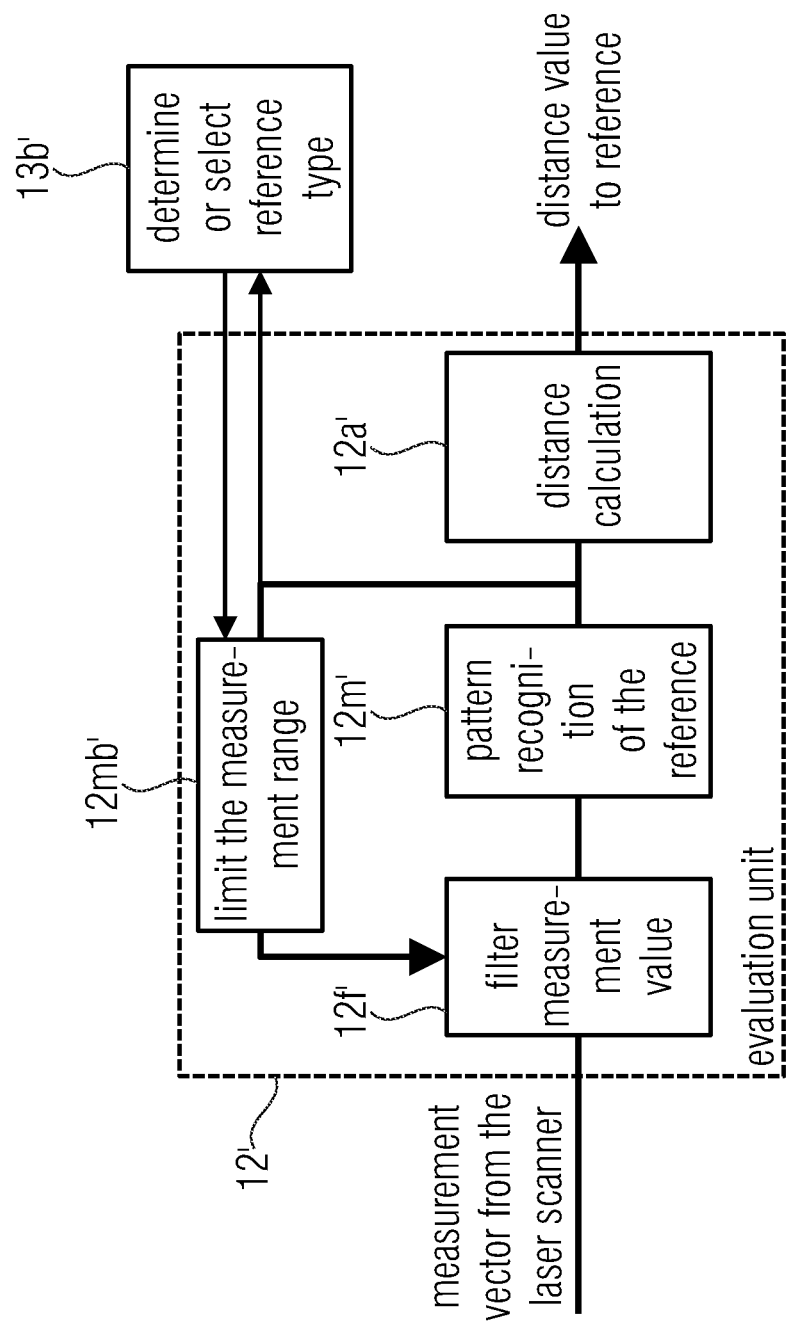

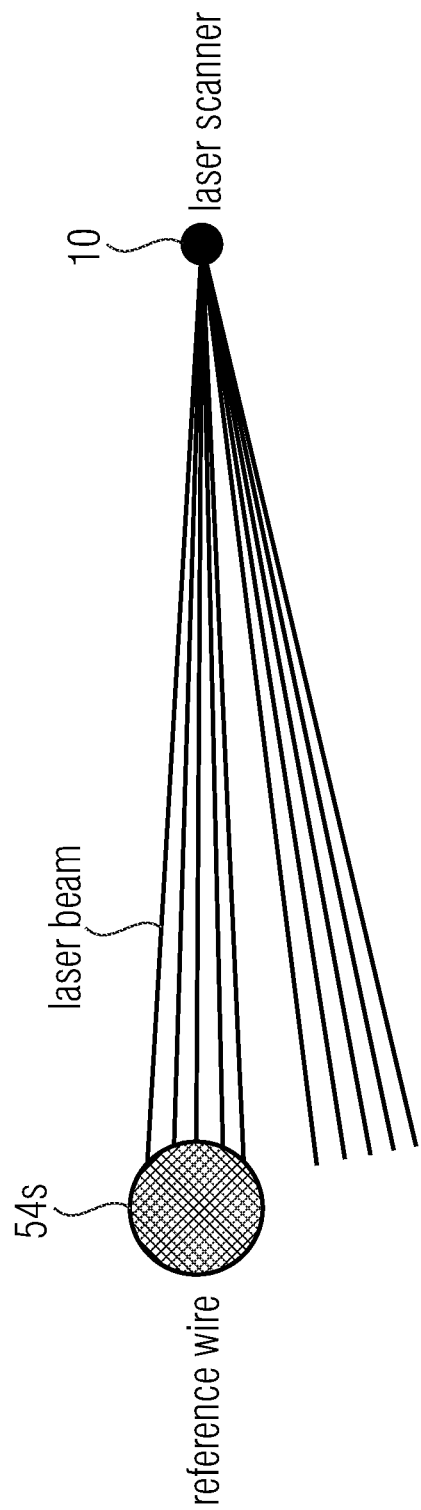

SENSOR SYSTEM FOR A ROAD FINISHING MACHINE

CROSS-REFERENCE TO RELATED APPLICATIONS

This application is a continuation of copending International Application No. PCT/EP2018/080045, filed Nov. 2, 2018, which is incorporated herein by reference in its entirety.

Embodiments of the present invention relate to a sensor system for a construction machine, in particular for a road finishing machine. Further embodiments relate to a construction machine or, in particular, a road finishing machine with a corresponding sensor system. Additional embodiments relate to a method for determining a distance to a reference and/or an angle with respect to the reference. Additional embodiments relate to a computer program. Embodiments relate to a steering sensor for a road finishing machine, and a height sensor for leveling a paving plank for a road finishing machine.

BACKGROUND OF THE INVENTION

Considering the main tasks of the road finishing machine in practice, precise steering is needed in addition to highly accurate plank leveling. Today, this is usually carried out manually by the finishing machine operator. For paving to be as accurate as possible, the finishing machine driver has to make steering corrections according to a specified reference such that the finishing machine travels as parallel as possible and at the same distance from this reference. Incorrect steering and interfering variables involve steering correction at the plank, which is carried out by the plank operator via the control from the extendable part of the plank. Only continuous and precise adjustment of the steering from the finishing machine's tractor part and tracking from the extendable plank part guarantee the correct road course specified by the reference.

Automation of the entire steering process (tractor and plank) could significantly reduce the workload of the road finishing machine's operating personnel during asphalt paving. This automation task involves a sensor, referred to as the steering sensor below, which is able to adjust to the different reference types, track the same and determine the distance to the reference with high precision. Therefore, there is a need for an improved approach.

SUMMARY

According to an embodiment, a sensor system for a construction machine, in particular a road finishing machine, may have: a first laser scanner that can be arranged on the construction machine and is configured to search a specified angular range for objects and to determine corresponding distance values, which describe the distance to the one or several objects, together with corresponding intensity values, which describe an intensity of a reflection resulting at the one or several objects, across angles of the specified angular range, an evaluation unit configured to detect an object as a reference together with an associated angle starting from a known pattern including the distance values and the intensity values across scanning angles, and configured to determine a distance to the reference and/or the angle with respect to the reference.

Another embodiment may have a construction machine, in particular a road finishing machine with an inventive sensor system.

According to another embodiment, a method for determining a distance to a reference and/or an angle with respect to the reference using a first laser scanner arranged on the construction machine and configured to search a specified angular range for objects and to determine corresponding distance values, which describe the distance to the one or several objects, together with corresponding intensity values, which describe an intensity of a reflection resulting at the one or several objects, across angles of the specified angular range, may have the steps of: detecting an object as a reference together with an associated angle starting from a known pattern including the distance values and the intensity values across scanning angles, and determining a distance to the reference and/or the angle with respect to the reference.

Another embodiment may have a non-transitory digital storage medium having a computer program stored thereon to perform the inventive method for determining a distance to a reference and/or an angle with respect to the reference when said computer program is run by a computer.

Embodiments of the present invention provide a sensor system for a construction machine, in particular a road finishing machine having at least one (first) laser scanner and an evaluation unit. The first laser scanner is arranged, for example, laterally on the construction machine/finishing machine itself. The laser scanner is configured to search a specified angular range (e.g. semicircle or 180-degree arc or full circle or 360-degree arc or other angular range) for one or several objects (such as a rope, a marking or a milling or curb edge or the like) and to determine corresponding distance values describing the distance to the one or several (found) objects together with corresponding intensity values describing an intensity of a reflection resulting at the one or several objects. This determination takes place across the specified angular range, with allocation of the distance values or intensity values to a respective angle within the specified angular range. The evaluation unit is configured to detect an object as a reference together with the associated angles, starting from a known pattern consisting of or comprising the distance values and the intensity values across the angles. Here, for example, starting from a certain pattern (combination of the variation of the intensity values together with the variation of the distance values across the angles), the curb or the rope is detected or even differentiated from each other such that the same can serve as a reference. Further, the evaluation unit is configured to determine a distance to the reference and/or an angle with respect to the reference. Here, for example, the distance between the first laser scanner and the reference is determined and/or an angle from a reference position (e.g. a horizontal line) with respect to the determined reference.

Embodiments of the present invention are based on the finding that laser scanners, extended by a corresponding evaluation, are suitable for detecting and differentiating measurement data patterns from different references that are relevant for steering or for height control/leveling of a paving plank of a road finishing machine or, in general, for controlling a road finishing machine. Further, the evaluation unit evaluates or tracks the measurement values associated with the detected reference (continuously, in particular along the travel path of the construction machine) in order to determine a (transverse) position of the road finishing machine with respect to the reference (e.g. distance or angle). According to a first application scenario, it is advantageously possible to control the steering of the road finishing machine very precisely by using the described sensor system, e.g. during asphalt paving. For this, the corresponding distance values are transmitted to the steering system, for example. Optionally, based on the position information, the steering corrections or, in general, the steering task of the road finishing machine or, in general, the control task of the road finishing machine can be performed automatically. This corresponds to a control circuit for the steering, which mostly relieves the operating personnel from the steering task.

According to an embodiment, the laser scanner can alternatively or additionally be arranged on an extendable part of a plank of the road finishing machine (or generally on a movable tool of the construction machine) to determine the (transverse) orientation of the component with respect to the reference. This results, for example, in the following application scenario: In addition to or instead of the steering task, the sensor system can advantageously also be used to regulate the plank width: Laser sensor(s) arranged on the extendable parts of the plank serve, for example, to track the extendable parts of the plank to a reference. Thus, the task of the (alternative or second) control circuit set up in this way for controlling the extendable parts is thus to keep the distance to the reference constant by moving the extendable plank parts accordingly to allow small corrections to the width/transverse position of the pavement to be applied.

According to an embodiment, the laser scanner can alternatively or additionally be arranged on the traction arm or in the vicinity of the traction point and/or on the plank, for example on a side plate of the plank or on an extendable part of the plank of the road finishing machine, and can be used as a height sensor to provide height information alternatively or additionally to the steering information. Advantageously, the sensor system can thus also be used for height control or leveling of the plank. If the laser scanner is installed in the vicinity of the traction point, the same is also suitable for height scanning on a reference rope, for example. In contrast to the use as a steering sensor, the sensor position of the laser scanner may have a different (mounting) position when used as a height sensor, e.g. in the vicinity of the traction point of the construction machine, while the sensors used for steering purposes may be mounted at the corners.

As indicated above, the evaluation unit is configured to detect different types of objects as a reference based on different known patterns. For example, according to embodiments, the evaluation unit may be connected to a user interface via which a user has the possibility to make a user selection regarding the type of object to be detected. In response, the evaluation unit searches for the corresponding type of object to be detected, such as a corresponding milling edge or a corresponding rope to be used as a reference.

According to embodiments, the object to be detected is a rope. The evaluation unit detects a rope, for example, if a maximum of the intensity values is present in the form of a (narrow) peak and if, at the same time, a minimum of the distance values is also present in the form of a (narrow) peak. For example, a (narrow) peak has a width of 2° to 4° or of 1° to 7.50° (generally in the range 0.1° to 10° or 15°). Alternatively, the evaluation unit can also detect a rope if a peak-shaped change (maximum) in the intensity values and a peak-shaped change (minimum) in the distance values are detected within the same angle in the specified measurement range. According to embodiments, when using a rope as a reference, a distinction has to be made between two modes (detection in a bird's-eye view from above or detection in a lateral perspective). According to an embodiment, the evaluation unit detects a rope from a bird's eye view, e.g. based on the pattern explained above, and determines an angle $\alpha$ in the specified angular range, e.g. with respect to a perpendicular on the ground from the laser scanner. Further, starting from the measured/determined angle $\alpha$, the evaluation unit can calculate a distance a using the formula $a = \tan \alpha - h$ (height h of the laser scanner with respect to the rope). According to further embodiments, the evaluation unit is configured to detect a rope from a lateral perspective and to determine a distance to the rope by the pure laser measurement.

According to further embodiments, the evaluation unit is additionally or alternatively configured to detect an edge, such as a milling edge or a curb edge. This edge can be detected in two different modes, namely in a lateral and in a bird's eye view. For example, the evaluation unit detects an edge in a lateral perspective if the intensity values form a superelevation below an angular range of the specified angular range or if the distance values form a plateau of the distance values below an angular range of the specified angular range. Alternatively, the evaluation unit detects a combination of the plateau of the distance values and an elevation of the intensity values as an edge, in particular if the plateau and the superelevation occur in a common angular range of the specified angular range. According to further embodiments, the evaluation unit detects an edge in the bird's eye view if the distance values form a jump in an angle of the specified angular range or if the distance values form a (continuous) maximum at an angle of the specified angular range. Advantageously, the evaluation unit detects an edge when the distance values form a jump in an angle of the specified angular range and the distance values simultaneously form a maximum at this angle. Here, according to further embodiments, it is possible, analogously to the detection of the rope, that a (lateral) distance a is determined based on the (measured) angle below which the edge was detected, of the formula $a = \tan \alpha * \text{height } h$.

According to a further embodiment, the evaluation unit is configured to detect a line, e.g. in the lateral perspective on a wall or in a bird's eye view on the ground. According to embodiments, the evaluation unit detects a line when a maximum of the intensity values in the form of a peak in combination with a continuously/steadily varying distance value or even a minimum of the continuously varying distance value at an angle is obtained. In the case of lateral distance determination, the distance value determined by laser is again taken as reference value for control, while in the case of detection of the line from above, distance determination is again performed by calculating the angle.

According to embodiments, the evaluation unit reads out the distance values continuously, e.g. while driving, i.e. over a certain time or over a distance traveled. In this case, for example, n distance values are obtained, which should be essentially the same due to the fact that the distance traveled is very small at the low speed typically traveled. Therefore, these final distance values can be averaged with the following formula:

$$\overline{\text{distance}} = L = \frac{\sum_{i=0}^{n} l_i}{n}$$

where $l_i$ is the distance value of the respective measurement, i is the number of measurements, n is the number of successive approximately equal measurements, and L is the mean distance value to the reference.

As explained above, the laser sensor can be arranged both on an extendable part of the plank or on a road finishing machine itself. According to an embodiment, the sensor system therefore comprises at least two laser sensors, one arranged on the construction machine/road finishing machine (for steering or leveling purposes) and one or even two arranged on the (two) extendable parts of the plank (for plank width regulation) or for height regulation/leveling of the paving plank. The sensors are arranged laterally (laterally at the front and laterally at the rear) on sides of the reference. Here, the front side of the road finishing machine (opposite the plank, for example at the front of the traction drive), namely as far forward as possible, or the rear, namely as far rearward as possible, is selected. In accordance with a further embodiment, the two laser sensors can of course also be arranged on only one side, if it is assumed, for example, that only one reference is present on only one side. According to a further embodiment, the sensor system comprises at least four laser scanners, namely two on the extendable parts for regulating the plank width and two on the road finishing machine for steering the road finishing machine itself (for example, in the front area of the traction drive) or also for height regulation/leveling of the paving plank, assuming, for example, that there are two lateral references.

According to embodiments, the sensor system comprises a control configured to control the extendable parts of the plank or the plank. This control may be performed taking into account a machine fixed point, assuming that the laser scanner(s) is/are located on the extendable part or on the plank, but with a certain offset to the areas to be controlled. In accordance with further embodiments, the sensor system includes a control for controlling the steering of the road finishing machine. In this case, the control structure can be carried out taking into account a machine fixed point, e.g. to the pivot point of the road finishing machine.

Another embodiment relates to the fact that, in addition to evaluating an edge or determining the distance to a reference wire, the laser scanner can also generate height information for leveling a paving plank of a road finishing machine if the leveling of the paving plank is carried out via a reference wire. In this case, scanning is performed laterally from the reference wire. The sensor is mounted on the traction arm in the vicinity of the traction point, i.e. in the front area of the traction arm as seen in the direction of travel of the road finishing machine, and offers possibilities for optimized leveling of the paving plank of a road finishing machine at this position.

According to embodiments, the control is configured to regulate or level the paving plank in its height position.

A further embodiment relates to a method for determining a distance to a reference and/or an angle with respect to the reference using at least a first laser scanner as explained above. The method comprises the steps of:
Detecting an object as a reference together with the associated angle starting from a known pattern, includes the distances and the intensity values across the angles of the specified angular range;
Determining a distance to the reference and/or an angle with respect to the reference (from which the distance can then be determined in the end).

This method may also be computer-implemented in accordance with further embodiments.

A further embodiment provides a road finishing machine and a corresponding sensor system.

BRIEF DESCRIPTION OF THE DRAWINGS

Embodiments of the present invention will be detailed subsequently referring to the appended drawings, in which:
FIG. 1a is a schematic representation of a sensor system according to a basic embodiment;
FIGS. 2a to 2d are schematic representations of a road finishing machine with differently arranged laser scanners to explain the different references to be located according to embodiments;
FIGS. 4a to 4f are schematic representations for explaining the pattern recognition "milling edge" according to embodiments;
FIGS. 5a to 5b are schematic representations for explaining the pattern recognition "line" according to embodiments;
FIGS. 6a to 6b are schematic representations of functional blocks of an evaluation unit according to embodiments;
FIG. 7b is a schematic representation for explaining the conversion of angular information into height information according to embodiments;
and
FIG. 7c is a schematic representation for explaining a measurement of the number of laser pulses until a reference wire is struck.

DETAILED DESCRIPTION OF THE INVENTION

Figure 1B:
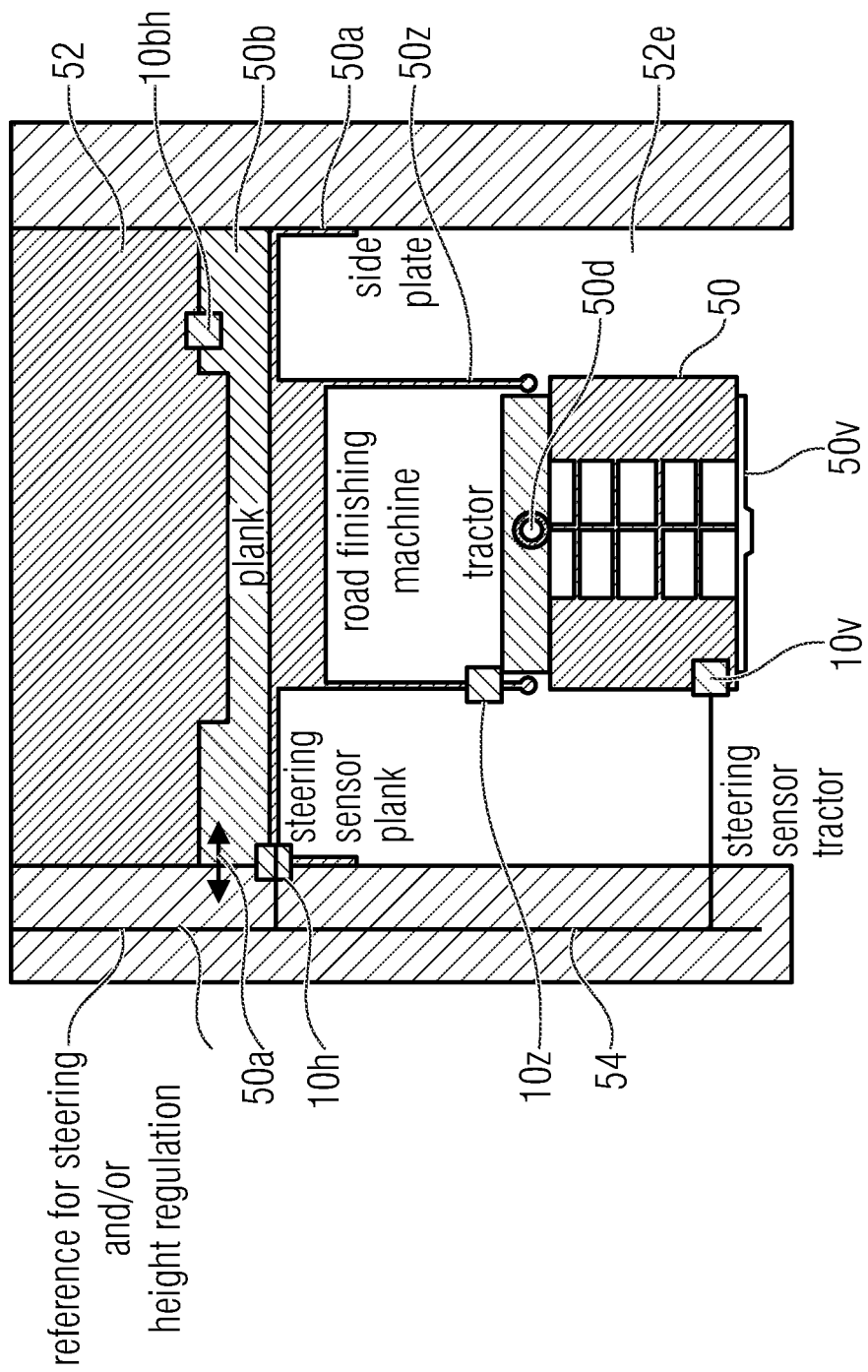
FIG. 1b is a schematic representation of possible attachment locations of the sensors of the sensor system on a road finishing machine according to further embodiments.

Before embodiments of the present invention will be explained below with reference to the accompanying drawings, it should be noted that suitable elements and structures are provided with the same reference numbers so that the description is applicable or interchangeable with one another.

FIG. 1a shows a schematic representation of a sensor system 1 with a laser module as first laser scanner 10 and an evaluation unit 20, which is connected to the laser scanner 10, for example, via a cable.

The laser scanner 10 serves as a sensor element and scans, e.g. in a laser plane 11, the measurement range for objects, such as a rope or a curb or another element that can serve as a reference. The laser plane 11 forms a fan of possible scanning angles (60-degree fan, 135-degree fan or 180-degree fan or fan with any angle/angular range) spanned by a laser beam, which forms the unrestricted measurement range. The fan is spanned, for example, perpendicularly to the direction of travel, wherein perpendicularly can mean that a zero angle projects perpendicularly downward and further angles to the left and right with +/−x°, e.g. +/−90° can be scanned (in this range, scanning is possible, so that the same can be designated as a range including scanning angles). For this purpose, a rotating laser beam (red light or light in the IR range) is emitted along the fan, for example, and the reflection characteristic is received by means of a receiver integrated in the scanner. Such scanners have, for example, a scan rate of 50 Hz to ensure time and angular resolution. The range of such scanners can be seen in the range of a few millimeters (1 mm) to 100 m. The use of a laser 10 as a sensor offers the advantage that this sensor operates in a contactless manner and can not only detect objects, but also simultaneously determine the distance between the object and the laser scanner and/or the angle of the object to a reference position (e.g., a horizontal or vertical, which can vary depending on the orientation of the laser scanner and may also be adjusted for an offset resulting from an angled orientation/misalignment of the laser scanner) with high precision. Further, this sensor also enables continuous tracking of the reference. Tracking means that over time the distance to and/or the angle with respect to the reference is determined/tracked starting from a known (position/alignment of the scanner). Detecting, tracking and evaluating the reference is performed by the evaluation unit 20.

The evaluation unit 20 can be realized by a CPU, for example, and is configured to process the measurement values provided by the laser module 10 such that the highly accurate distance to the steering or height reference is available as a measurement result at the end of the calculation chain. The result is then made available, for example, to a higher-level steering control system and/or height leveling regulation.

The steering sensor 1 or sensor system 1 shown herein can be used universally, namely both for tractor steering (steering of the traction drive) and for plank control (lateral position and/or height). As shown with reference to FIG. 1b, the universally usable steering sensor 1 (sensor system 1) or the laser module 10 can be arranged at several different lateral positions of the road finishing machine, depending on whether the sensor system 1 is used as a steering sensor and/or as a height sensor.

FIG. 1b shows a road finishing machine 50 with a plank 50b, which is laterally limited by the extendable plank cantilevers 50a. Depending on the extension state of the extendable parts 50a, the width of the plank 50b changes and thus also the width of the asphalt layer 52 to be paved. In order to control the road finishing machine 50, e.g. in the paving area 52e, or to adjust the plank width and/or also to carry out height leveling of the plank 50b, reference is made to a reference 54, e.g. a taut rope next to the paving area 52e. This reference can be detected using the laser sensors explained in FIG. 1a.

According to a first variant, a paving position on the road finishing machine 50, e.g. at the front 50v, would be possible. A steering sensor 10v is shown purely as an example. The same is provided here at a maximum distance from the pivot point 50d of the road finishing machine. By means of this attachment location 10v, the steering in the road finishing machine can be supported or automated, as will be explained below. The steering of the road finishing machine 50 generally pursues the target of controlling the forward movement of the machine 50 in parallel along the reference 54 during asphalt paving. To this end, the tractor initially takes over the actual steering of the machine 50 from the road finishing machine 50. For this, appropriate steering systems are available, which are generally operated manually.

If the distance between the sensor 10v and the reference 54 changes, this can occur as a result of a steering correction (rotation around the steering pivot point 50d), so that the direction vector of the machine changes. This change can be detected by means of the sensor 10v. Looking at the finishing machine at the time of the steering correction (cf. FIG. 1d), it can be seen that the distance a at the level of the pivot point 50d, has hardly changed compared to the time before the steering correction (cf. FIG. 1c), while the distance b changes much more. Consequently, at the time of steering correction, this measure results in a corresponding signal change for the steering sensor 10v or also all steering sensors arranged far to the front or far to the rear. Therefore, in an advantageous but not mandatory manner, attachment locations of the steering sensors 10v for the tractor or in general (that is also for the further embodiment "attachment location plank") are to be selected so that the same are as far away as possible from the steering pivot point 50d.

According to a further embodiment, the steering sensor can also be arranged on the plank 50b or, in particular, on the extendable part of the plank 50a. This makes it possible, in particular, to guide the side plates of the extendable parts 50a with respect to the reference 54. As an example, the attachment location 10h for the steering sensor is illustrated on the extendable part 50a. While the steering sensor 10v serves to automate the steering of the tractor 50d, the steering control circuit for the plank can be automated by means of the steering sensor 10h. Minor steering inaccuracies can be corrected via the plank 50b or the extendable parts 50a of the plank 50b. According to embodiments, the steering sensors 10h attached to the rear form a control circuit together with the plank, while the sensors 10v attached to the front provide a steering control circuit for the tractor. In this respect, there is a separate control circuit for each sensor 10v and 10h that maintains a constant distance from the specified reference 54. In particular, minor steering inaccuracies as well as other disturbance variables that do not result in the desired paving should be corrected by the operating personnel at the control stand or automatically via the extendable part 50a of the plank 50b.

The attachment of the steering sensors to the tractor part and to the plank, as well as the different reference types in parallel in practice, involves different evaluation mechanisms which, in addition to identifying the reference, also determine the distance to the reference. This will explained in detail below.

According to an optional/alternative variant, the sensor 10z can also be mounted in the area of the traction arm. Further, reference number 10bh indicates another possible attachment location for the sensor on the rear edge of the plank. This attachment location is a variant for height control.

Figure 1C:
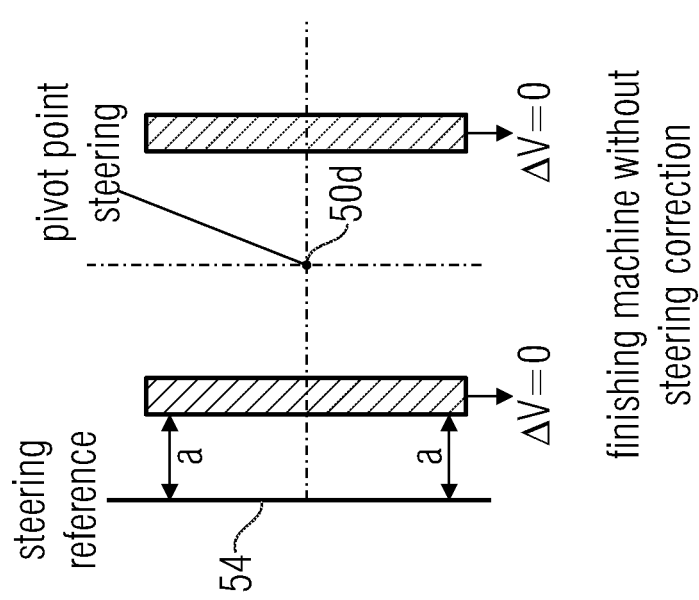
FIG. 1c to 1d are schematic representations for illustrating the measurement quantities to be measured by means of the sensor system in relation to the regulation quantities.
Figure 1D:
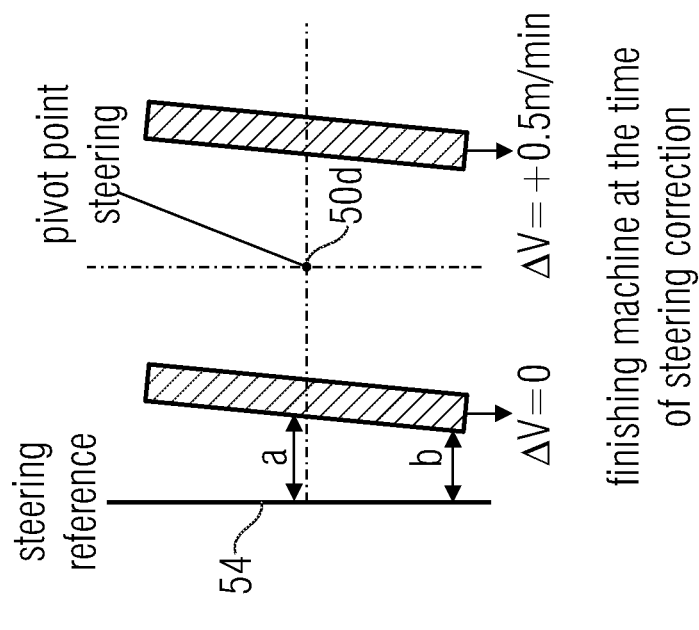
Figure 2C:
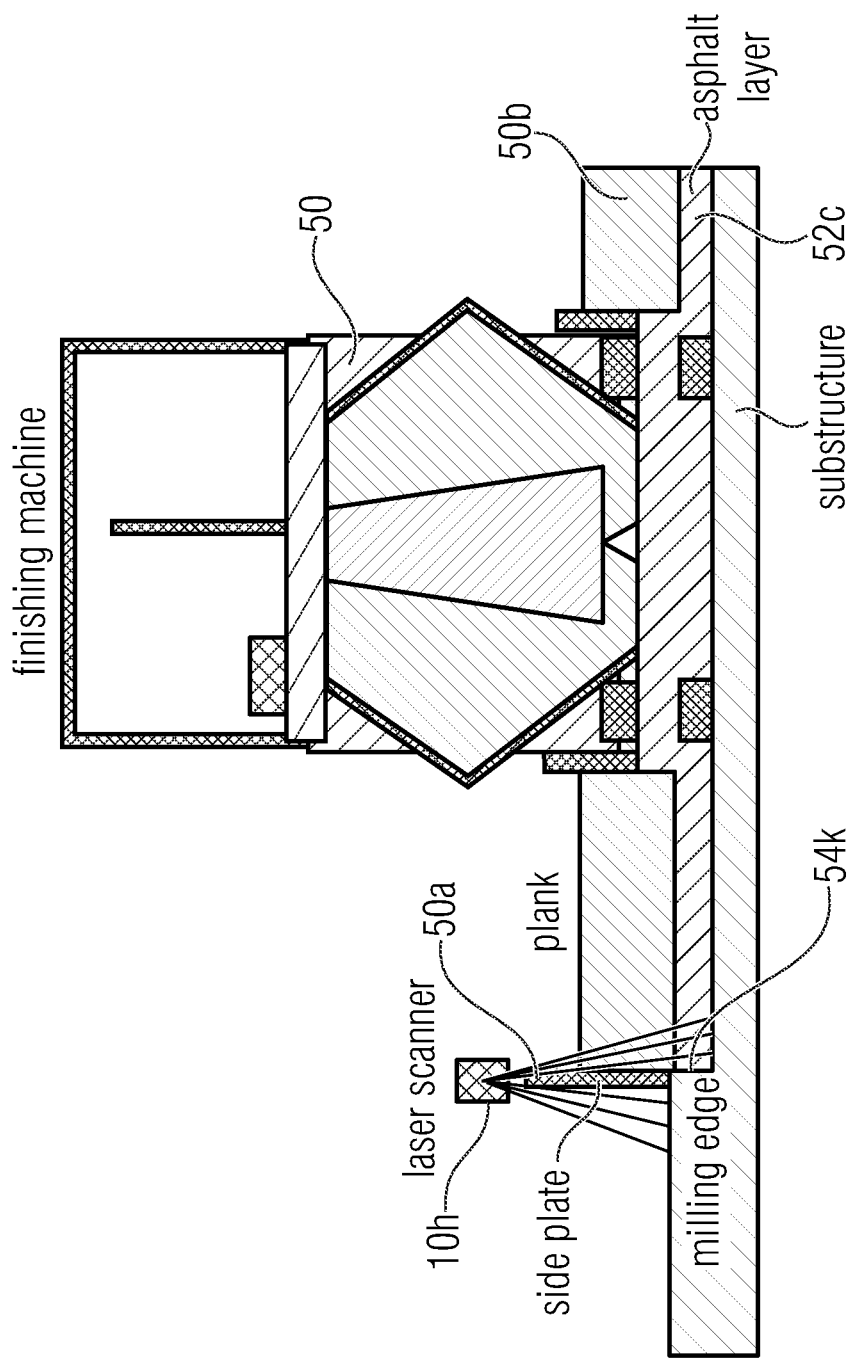

FIG. 2a illustrates the "steering sensor" case for the tractor part from the finishing machine for scanning a milling edge:

The steering sensor 10v of the tractor 50 should, as explained with reference to FIG. 1c and 1d, be attached as far as possible in the lead so that a steering correction from the finishing machine significantly changes the distance change to the reference 54k (here a milling edge). This achieves a much better fine adjustment of the steering. At this point, it should be noted that this positioning is advantageous but not mandatory. Likewise, positioning the sensor 10v on the side is advantageous, as shown here in the front view of FIG. 2a. Reason for the side positioning is that the reference, here the milling edge 54k is located in the relevant scanning range 10s of the laser scanner 10v. As shown here, the laser scanner 10v scans the ground 52e on which the asphalt layer 52 is to be applied for the milling edge 54k in a measurement range spanned, for example, at a 30-degree angle. Here, this relevant measurement range 10s already inclined with respect to the horizontal, for example by 15 degrees. Thus, this results in an exemplary scanning range of 15 to 45 degrees with respect to the horizontal. Here, it should be noted that this measurement range can vary depending on the mounting height of the steering sensor 10$v$ (with respect to the ground 52$e$) and the (lateral) distance of the milling edge 54$k$.

Figure 2D:
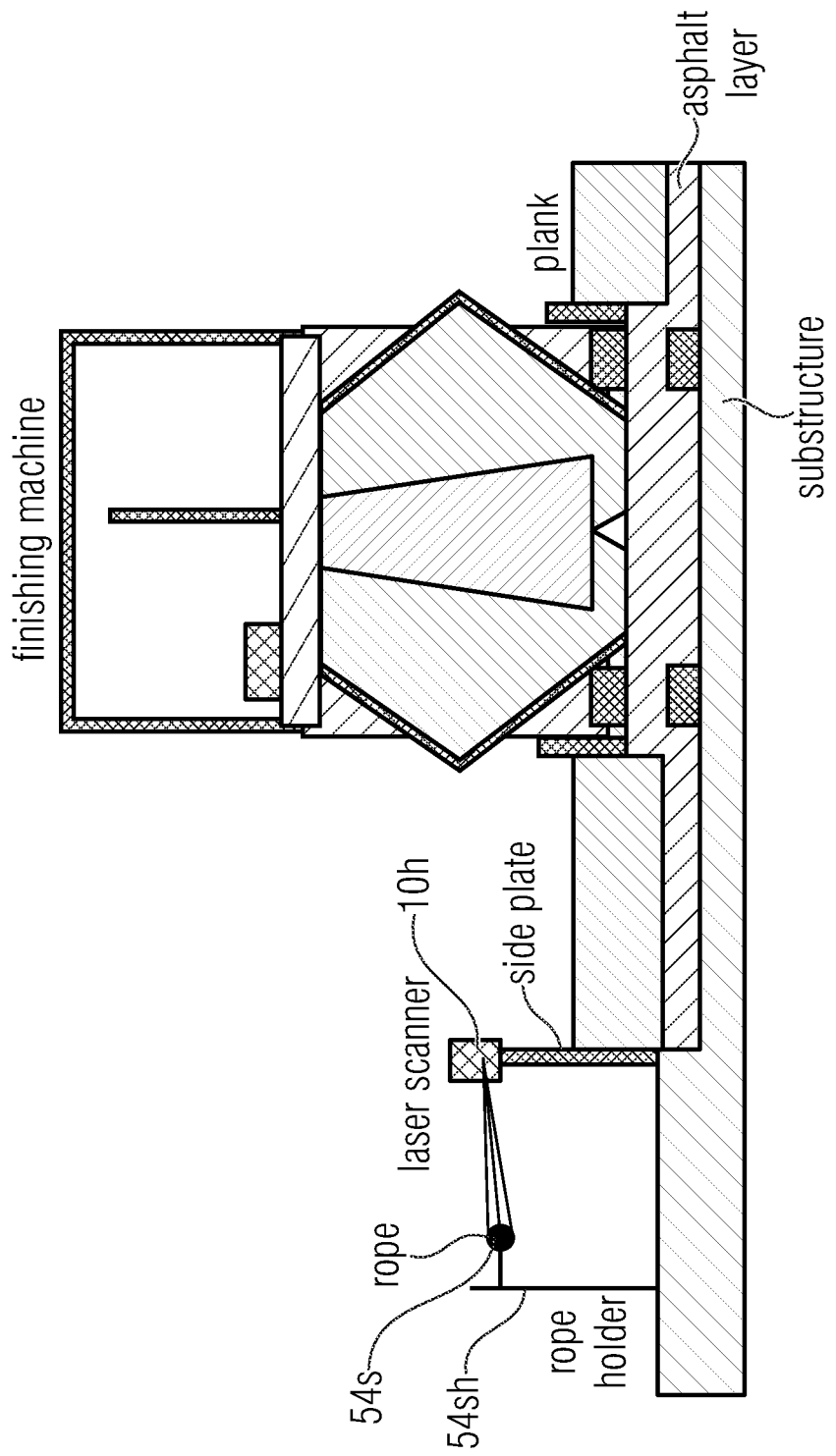

FIG. 2$b$ illustrates another case, namely the arrangement of the steering sensor 10$v$ for scanning a reference rope 54$s$, which in turn is arranged laterally on the finishing machine 50 shown in the front view. In this embodiment, the rope 54$s$ is arranged by means of a rope holder 54$sh$ at approximately the same height with respect to the ground 52$e$ as the laser scanner 10$v$. In this embodiment, the laser scanner 10$v$ does not scan the ground 52$e$ but the lateral region for the rope 54$s$. Starting from an identical position of the sensor 10$v$ compared to the variant in FIG. 2$a$, in this non-angled variant, the distance between laser scanner 10$v$ and rope 54$s$ is determined directly by the laser, wherein in the variant in FIG. 2$a$ either the distance between the milling edge 54$k$ and the laser scanner 10$v$, taking into account the angle or the height, or also the angle below which the milling edge 54$k$ is obtained, taking into account the height, is used as corresponding reference measure.

FIG. 2$c$ shows the use of the laser scanner 10$h$ at the plank for scanning a milling edge 54$k$. Here, a laser scanner 10$h$ is located at the rear part of the finishing machine 50. Since the plank 50$b$ or, in particular, the extendable parts of the plank 50$a$ are positioned in the outer area of the asphalt layer 52$a$ to be applied due to the process, the laser scanner 50$h$ can be oriented vertically downwards so that the same detects the milling edge 54$k$ in a bird's eye view. For this, the laser scanner 50$h$ is arranged, for example, on the side plate of the extendable part 50$a$ such that the sensor can detect the milling edge from above, and such that the same detects the milling edge 54$k$ at the angle 0 degrees, i.e. vertically below the laser scanner 54$h$, when the side plate of the extendable part 50$h$ is correctly positioned. The deviation from this correct position, i.e. the angle at which the milling edge 54$k$ is detected, can be provided to the control circuit for the extendable parts 50$a$ of the plank 50$b$ as a measurement value.

FIG. 2$d$ shows a laser scanner 10$h$ arranged on the plank for scanning a reference rope 54$s$. The reference rope 54$s$ is again held by the holder 54$sh$, at the level of the laser scanner 10$h$. This use of a rope 54$s$ as a reference may be alternative to or in addition to the milling edge evaluation. Here, as already explained in connection with FIG. 2$b$, the distance to the reference is measured, the measurement value being provided to the control circuit for the extendable part of the plank.

Based on these positions, it can be seen that according to embodiments, a sensor system for the control circuit of the extendable parts of the plank comprises at least one laser scanner (on the side of the laser scanner for steering control) or two laser scanners (left, right), while a sensor system for steering the road finishing machine comprises one or two laser scanners. According to an implementation, the sensor system comprises an evaluation unit and four laser scanners. Alternatively, each laser scanner can also be directly coupled to an evaluation unit. According to embodiments, the same is directly integrated in the sensor.

According to an implementation, the sensor system includes a total of four laser scanners 10$v$ and 10$h$ arranged at the positions of extendable parts 50$a$ and finishing machine 50 itself on the left and right, respectively, as explained above.

The laser scanner 10 or the sensor system 1 can alternatively or additionally be arranged on the traction arm 50$z$ or in the vicinity of the traction point and/or on the plank 50$b$, for example on a side plate/side shield of the plank 50$b$ or on an extendable part of the plank 50$a$ of the road finishing machine, and can be used or employed as a height sensor in order to provide height information alternatively or additionally to the steering information. Advantageously, the sensor system can thus also be used for height control or leveling of the plank 50$b$. If the laser scanner 10 is attached in the vicinity of the traction point, the same is also suitable for height scanning on a reference rope 54$s$, for example. In this case, the sensor position of the laser scanner 10 may have a different (mounting) position when used as a height sensor as opposed to when used as a steering sensor.

In this case, scanning is performed laterally of the reference wire/reference rope 54$s$. The laser scanner 10 is attached on the traction arm 50$z$ in the vicinity of the traction point, i.e. in the front area of the traction arm 50$z$ as seen in the direction of travel of the road finishing machine, and offers possibilities for optimized leveling of the paving plank 50$b$ of the road finishing machine 50 at this position.

The laser scanner 10 enables height scanning based on the angular information provided with each sample. It is crucial that the laser scanner 10 has the highest possible angular resolution. In the example according to FIG. 7$a$, an angular resolution of approximately 0.01° is assumed. The distance to the reference wire/reference rope 54$s$ is usually between one and four meters.

Figure 7A:
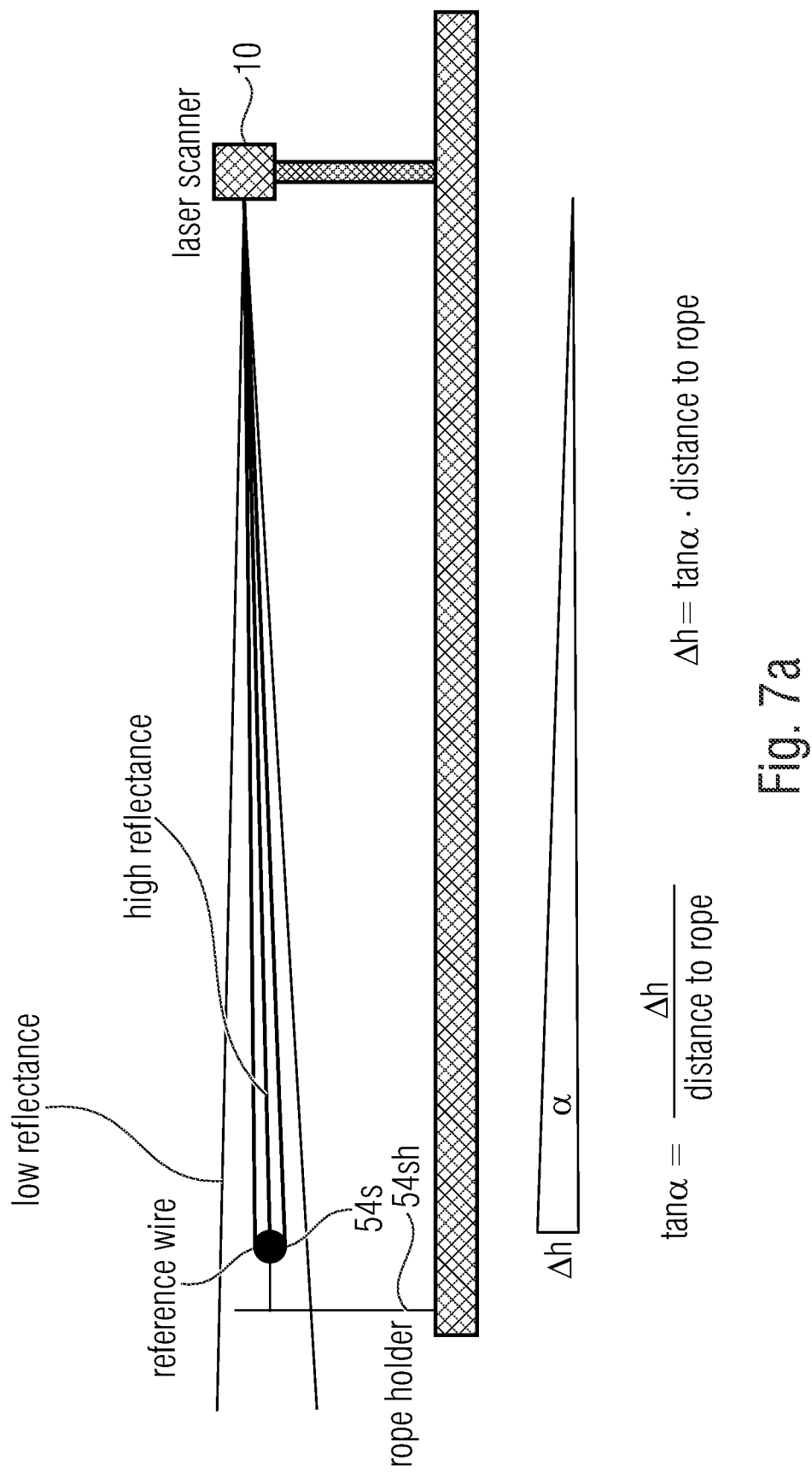
FIG. 7a is a schematic representation of the laser scanner for use as a height sensor according to embodiments.
Figure 70:
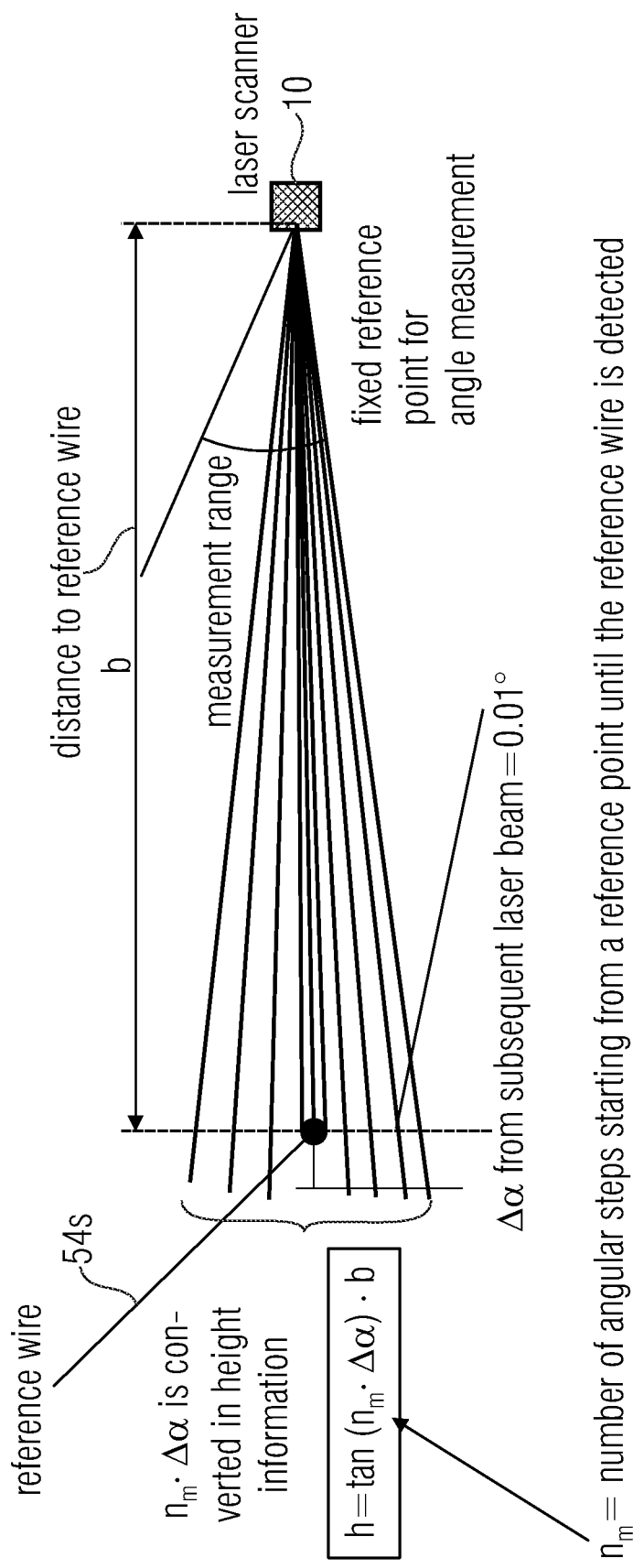

Thereby, a height resolution changes with the distance to the reference wire/reference rope 54$s$, i.e. increases with increasing distance to the reference wire/reference rope 54$s$. As shown in FIG. 7$a$, the height resolution $\Delta h$ is calculated using the formula $\Delta h$=tan angle (angular resolution laser scanner) distance. Thus, to calculate $\Delta h$, for example, the (measured) angle is used in combination with the (measured) distance to the reference 54$s$. With an angular resolution of the laser scanner 10 of approximately 0.01° as specified above and a distance of 4 m, this results in a height resolution $\Delta h$ of 0.70 mm. In comparison, the height resolution $\Delta h$ at a distance of 1 m is about 0.17 mm. Such height resolution values are absolutely sufficient for leveling the paving plank of a road finishing machine. In addition to a change in the height resolution at different distances from the reference wire/reference rope 54$s$, the number of times the laser beam, which emits a laser pulse with each measurement and determines the distance across the run time of the pulse, strikes the reference wire/reference rope 54$s$ also changes. This change in the number of strikes has to be taken into account for height calculation and is considered in more detail below.

A height measurement by the laser scanner 10, which is arranged on the traction arm 50$z$ in the vicinity of the traction point, i.e. in the front area of the traction arm 50$z$ as seen in the direction of travel of the road finishing machine 50, with respect to the reference wire/reference rope 54$s$ is thus determined not only by a distance measurement, but also by an angle measurement associated with each laser pulse. In order to obtain height information, or to determine a height which is related to the reference wire/reference rope 54$s$ and thus also represents the relative height from the traction arm 50$z$ of the road finishing machine to the reference wire/reference rope 54$s$, the angle measurement of the laser scanner 10 has a fixed reference point whose position does not change. This means that the angle information relates to this fixed point in the laser scanner 10. Starting from this fixed reference point, the measurement system then counts $n_m$ angular increments until the reference wire or reference rope 54$s$ is struck. With the help of the counted angular increments $n_m$ (alternatively with the help of the measured angle), the distance b to the rope 54s as well as the angle $\Delta\alpha$, which represents the angle between two successive distance measurements, the relative height (h) can be determined, namely with the formula h=tan $(n_m \cdot \Delta\alpha) \cdot b$. FIG. 7b will illustrate this in more detail. The relative height (h) determined in this way can in turn be provided with an offset such that the height value 0 mm is output by the measurement system in an adjusted state of the system "finishing machine—reference wire".

If the reference wire is struck several times by the laser beam, $n_m$ has to be evaluated so that the value of $n_m$ reflects the center of the rope 54s. FIG. 7c is intended to illustrate this. The number of laser pulses until the reference wire 54s is struck is calculated as follows:

$$n_m = n_i + n_r/2$$

with:
$n_i$=number of laser measurements where the reference was not struck; and
$n_r$=number of laser measurements in which the reference was completely struck by laser beams.

As an alternative to the illustrated calculation of the height in millimeters, the count of the laser pulses $n_m$ can also be used for indicating the height information. The difference to the height information in mm is only that $n_m$ is dimensionless and does not take into account the distance between laser scanner and reference wire.

According to an embodiment, each laser scanner is suitable for searching for a specific reference, e.g. the milling edge 54k or the reference rope 54s, based on a user input, for example, and for detecting the same for distance measurement or for continuously determining the distance. The selection is made via the user input or automatically depending on availability.

According to a further embodiment, another object, such as a line drawn on a wall, can also serve as a reference. Before distance measurement will be discussed in detail below, the laser scanner or an exemplary version of the laser scanner will be explained in advance.

Figure 6A:
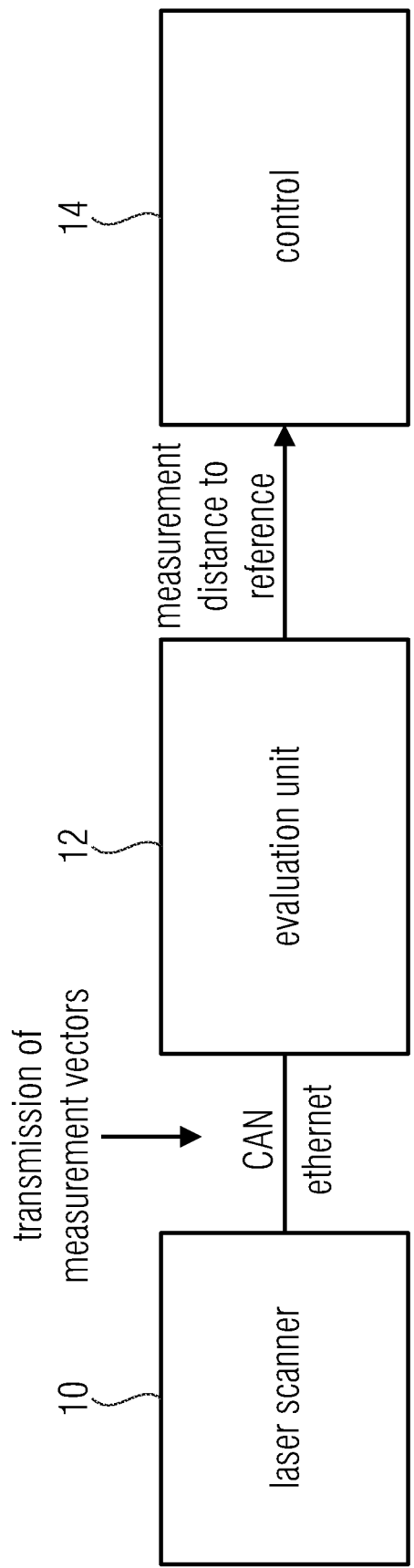
Figure 6C:
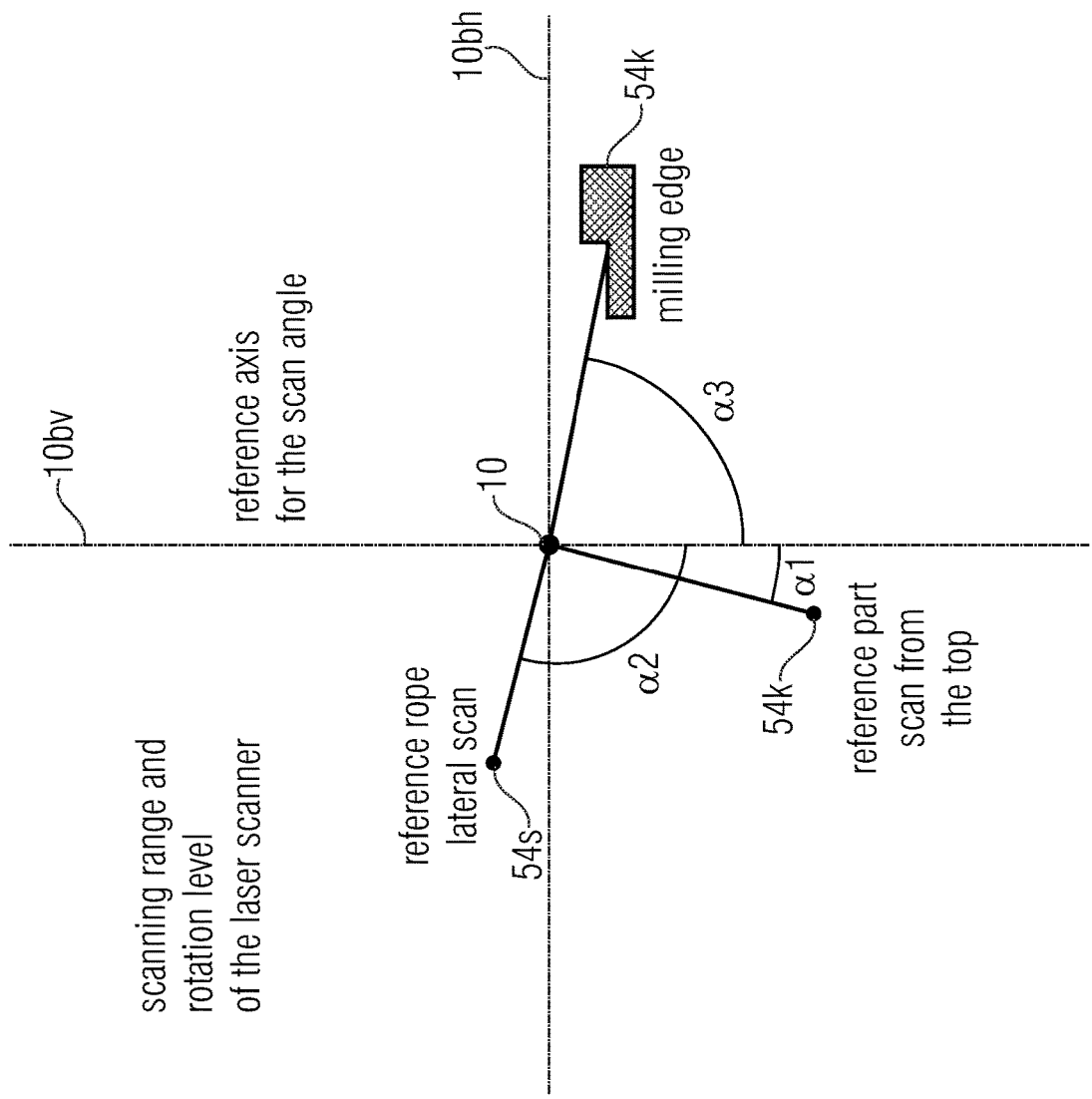
FIG. 6c is a schematic representation of a scanning range of a laser scanner.

The laser scanner 10, as shown for example in FIG. 1 or FIG. 6a, can be configured, for example, as a rotating laser scanner that performs continuous distance measurement, so that it is possible to measure all contours in the plane of rotation from the laser using the measured distance vectors. In addition to the distance value, the measurement vector from the laser scanner also has information about the signal strength (reflectance of the measurement) and the measurement angle, which refers to an internal reference point. For this, reference is made to the scanning range shown in FIG. 6c. As can be seen, the scanning range comprises two reference axes, namely a horizontal reference axis 10bh and a vertical reference axis 10bv. In the embodiment, all measurement angles $\alpha1$, $\alpha2$ and $\alpha3$ are related to the X-axis 10bv, i.e. to the vertical perpendicular. When laser scanners are fixed to the finishing machine, the reference point also has a fixed reference to the finishing machine itself, e.g. a distance to the motion vector through the pivot point. In total, this results in a measurement vector consisting of three information components per measurement process:

distance value to the detected object
signal strength (reflectance) and
measurement angle (to a reference axis 10bv or 10bh)

Depending on the height at which the sensor 10 is arranged, a measurement angle $\alpha1$, $\alpha2$ and $\alpha3$ to the respective reference results. Here, the reference angle $\alpha1$ is entered for scanning, for example, a milling edge 54k from above, $\alpha2$ for scanning a lateral reference 54s from the side and $\alpha3$ for scanning a temporal milling edge 54k. The measurement angles $\alpha1$, $\alpha2$ and $\alpha3$ represent the relation to the reference axis 10bv of the laser plane.

Referring to FIGS. 3a to 3e and 4a to 4f, the pattern recognition of the respective reference will be explained below. For the steering reference or for the reference in general, the following possibilities result in practice:
milling edge
taut reference rope
reference lines
curb edge Each steering reference, or reference in general, has a specific reference contour, which in turn produces specific waveforms when scanned, from which the identification of the reference can be derived. The waveforms have to be analyzed in an evaluation algorithm such that, in addition to reference detection, the exact distance to the reference is also determined.

Figure 3A:
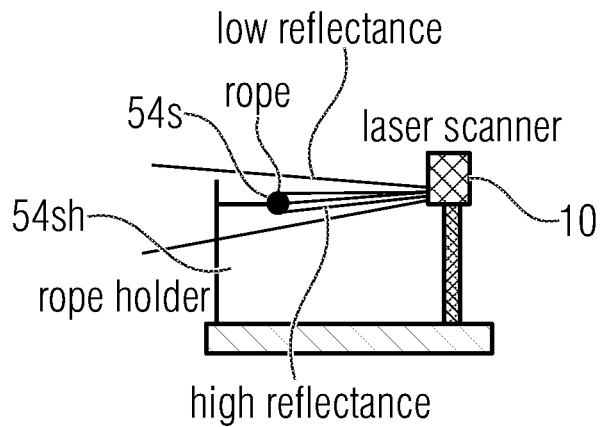
FIGS. 3a to 3e are schematic representations for explaining the pattern recognition "rope" according to embodiments.

FIG. 3a shows the pattern recognition of a rope 54s by means of the laser scanner 10. Here, the laser scanner 10 provides only a few measurements (3 to 5 measurements—depending on the distance and rope diameter) with a high signal amplitude and thus with high reflectance. All other measurement values are either further away and/or have a low signal amplitude.

Figure 3B:
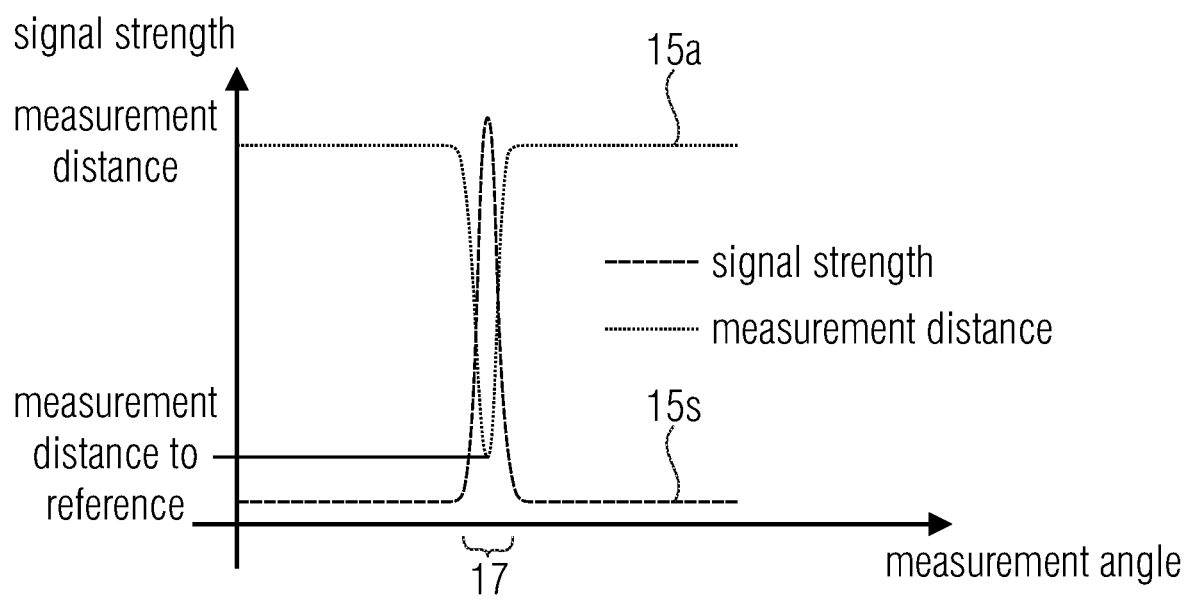
Figure 3B:
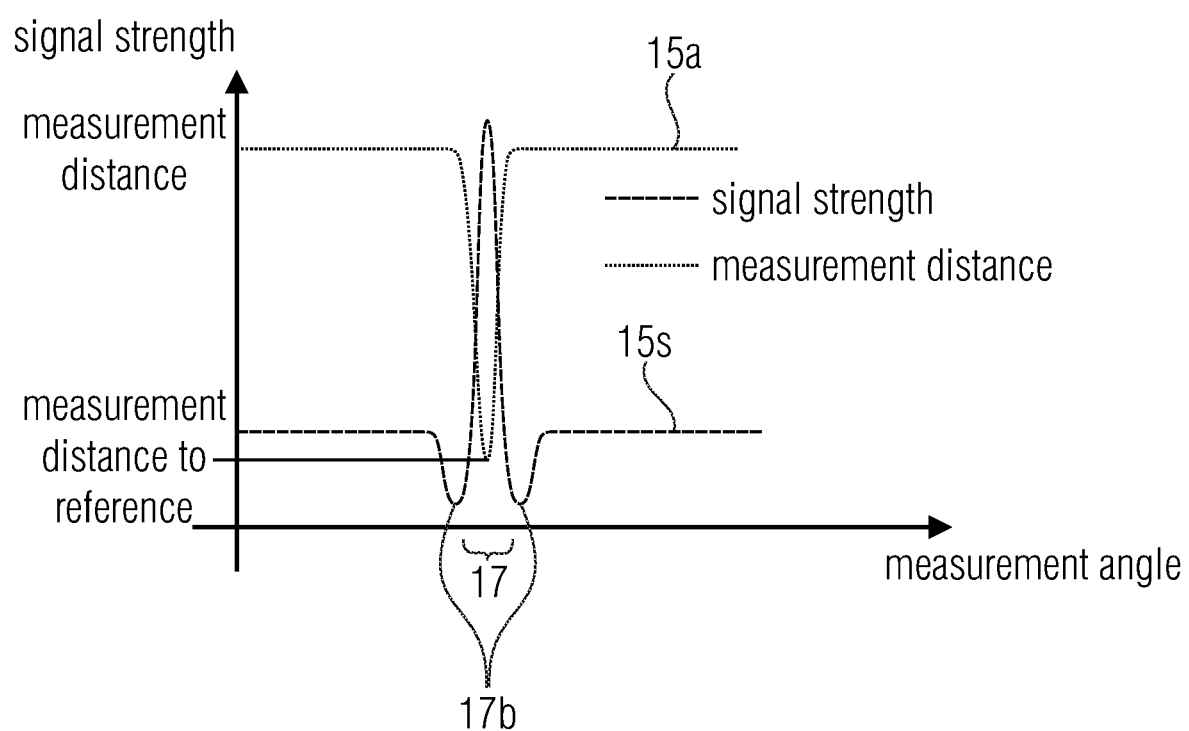

For the scanning situation shown in FIG. 3a, the waveform for distance measurement values 15a and signal strength 15s shown in FIG. 3ba is basically obtained. These two measurement values 15a and 15s are plotted over the measurement angle. As can be seen, peak-shaped waveforms of the measurement values 15a and 15s are formed in the scanning range 17, e.g. in the range between 88 and 92 degrees. These characteristics of a change (minimum) of the measurement distance 15a resulting at the same angle with a change (maximum) of the signal strength 15s at an angle enable the detection of a rope.

Based on the measurement value 15a at its minimum, the distance to the reference can be determined. In this respect, for the lateral rope detection situation, the evaluation algorithm has the task of determining the minimum distance to the reference at maximum signal strength, which then also reflects the measurement distance to the reference.

FIG. 3bb illustrates an alternative waveform for distance measurement values 15a and signal strength 15s. Here, the scanning range 17 is limited by minima 17b, between which the one maximum of signal strength 15s is formed. When detecting the rope, the minima 17b can be used in addition to the signal strength maximum.

Figure 3C:
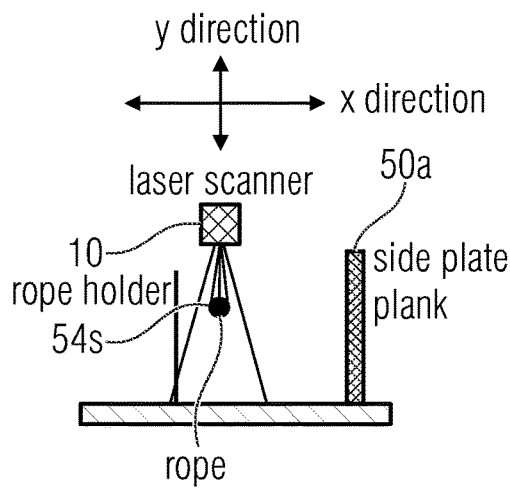

FIG. 3c illustrates the scanning situation with a laser scanner 10 for detecting a rope 54s arranged below the laser scanner 10. Here, the laser scanner is arranged, for example, on the side shield of the plank 50a. Such a measurement results in the waveform shown in FIG. 3d. As can be seen here, minimum and maximum of signal strength 15a and measurement distance 15s again coincide in the scanning area 17, so that the position of the rope or measurement angle for the rope can be detected.

Figure 3D:
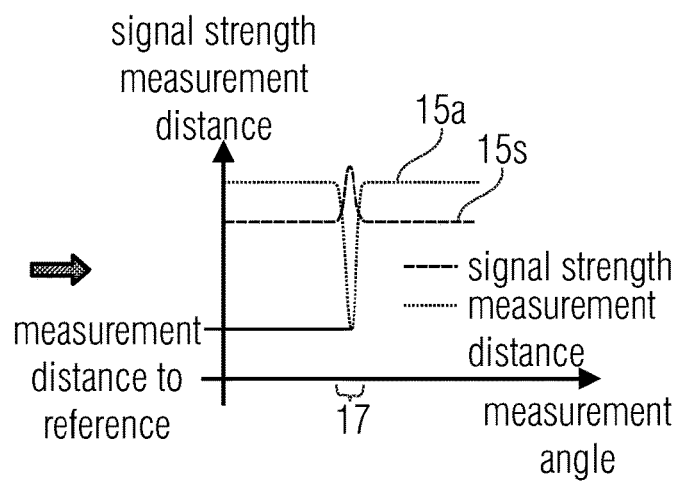

The evaluation of the reference rope 54s from above has measurement values with high signal amplitudes for a relatively large scan angle (30° to 50°), wherein a jump in measurement values (measurement values abruptly smaller) occurs directly above the reference rope. FIG. 3c shows the basic arrangement of the laser scanner 10 and scanning area 17, while FIG. 3d illustrates the associated waveform. It should be noted here that the measurement distance to the rope is measured in the Y direction. For regulation, however, a distance value in the X-direction is needed. For this, conversion as shown in FIG. 3c has to be performed.

Figure 3E:
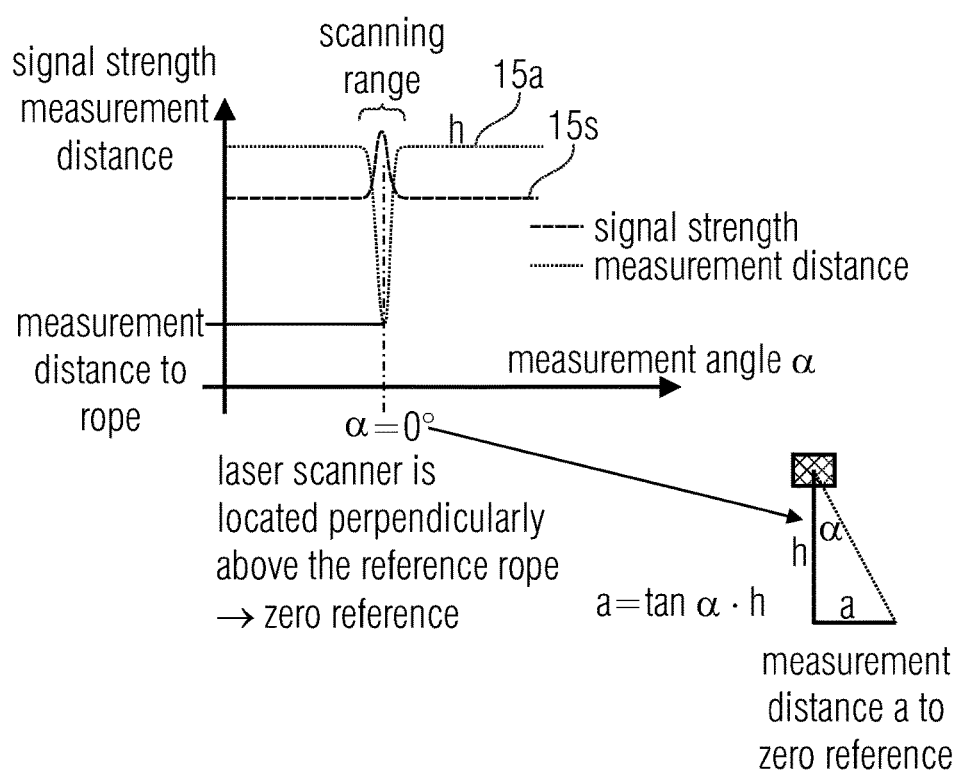

In this embodiment, not only the distance value resulting from the measurement value 15a is used to determine the distance, but the distance is determined by means of the following calculation. The calculation is explained below with reference to FIG. 3e. FIG. 3e shows the diagram from FIG. 3d, from which it can be seen that measurement values 15a and 15s coincide at the position a=0 degrees. By the measurement value 15a, the distance to the rope or the height h above the rope can be determined. In this respect, therefore, the laser scanner 10 is perpendicular above the rope 54s, wherein in this embodiment the zero reference, i.e. the measurement value has the value α=0 at this point, is established. If the angle to the rope now changes, the distance a can be determined using the formula a=tan α·h, as illustrated with reference to FIG. 3e. The distance value a determined in this way provides the distance to the zero reference in the X direction.

While the zero reference is determined in the laser scanner, the laser scanner has to be installed during setup so that the distance value a is as close to zero as possible. The distance value in the X direction determined in this way can then be used as a control variable.

In this respect, the use of the rope as a lateral reference differs from the use of the rope as a reference in a measurement from above, mainly in the calculation of the control variable, but not in the signal pattern that occurs when the object is detected.

Figure 4A:
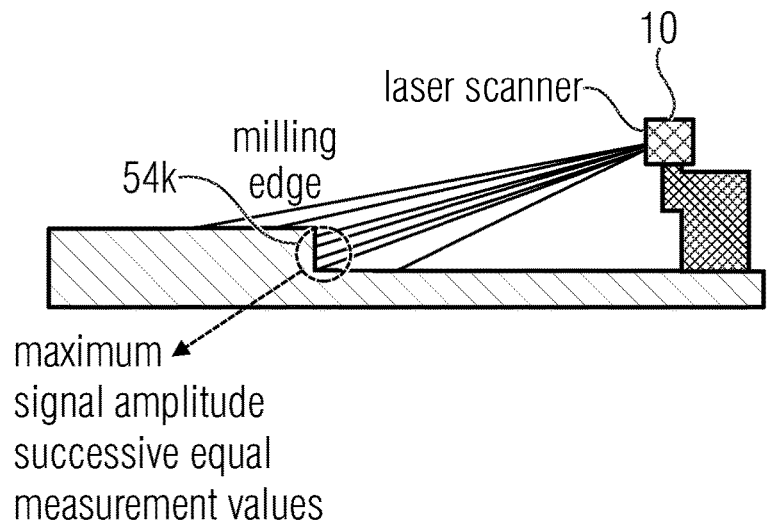
Figure 4B:
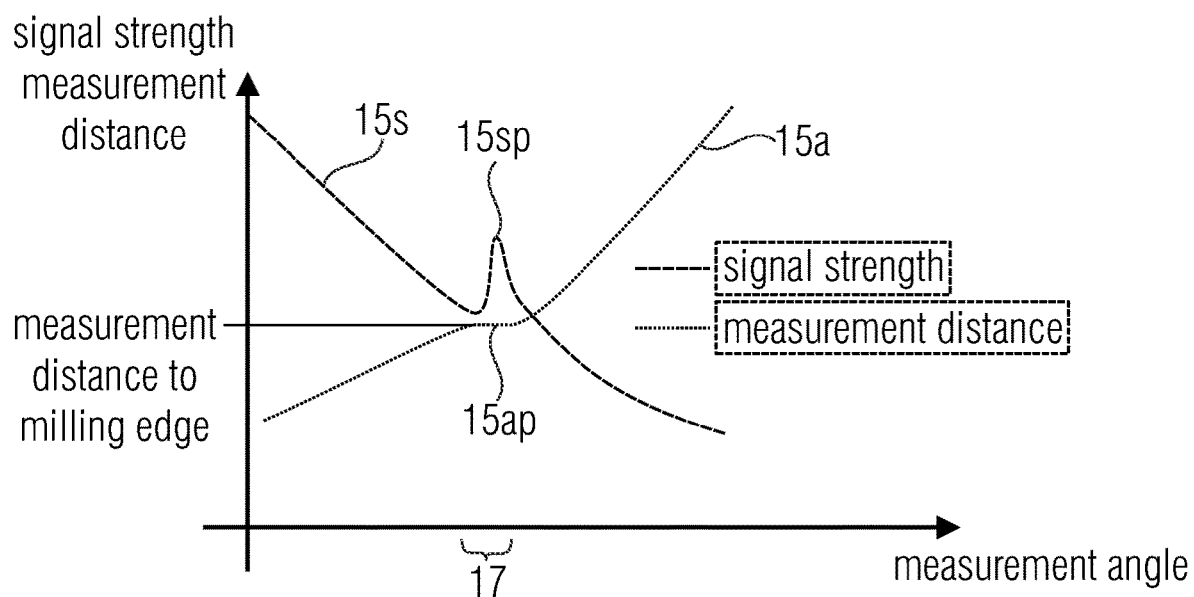

FIG. 4a illustrates the pattern recognition of a milling edge 54k by means of the laser scanner from the side. For example, the laser scanner 10 again scans a scanning range of 15 to degrees or of 15 to 30 degrees.

A milling edge 54k also provides a special pattern which can be used to unambiguously determine the distance to the milling edge 54k. This is to be explained in FIG. 4b such that the pattern of the milling edge can be detected across successive identical measurement values with a relatively high signal amplitude. Looking at the waveforms of the signal strength 15s and the measurement distance 15a shown in FIG. 4b, the special pattern recognition of the waveforms becomes clear. A corresponding detection or evaluation algorithm detects the slight superelevation of the signal strength 15sp in the scanning range 17, which represents the measurement angle for the milling edge 54h. Additionally or alternatively, the evaluation algorithm can also detect approximately equal distance values 15a in this scanning range 17. In this respect, therefore, the pattern recognition of a milling edge from the side consists of detecting a lateral superelevation (cf. reference number 15s) as in the case of the signal strength and/or a plateau 15ap for the distance measurement value 15a, wherein 15sp and 15ap occur essentially in the same measurement range/angular range 17. The plateau 15ap also simultaneously represents the measurement distance to the milling edge to be evaluated.

Figure 4C:
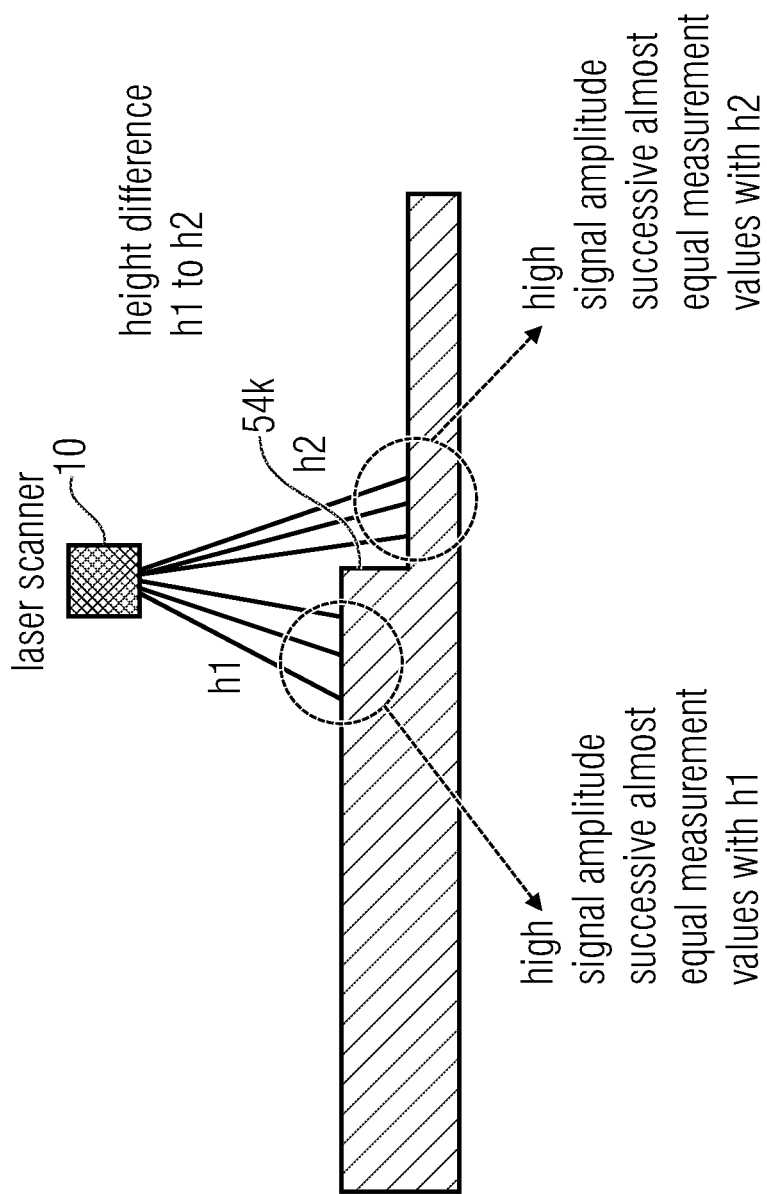

Referring to FIG. 4c, the pattern recognition of a milling edge 54k from above is explained. For this purpose, the laser scanner 10 is arranged above the milling edge 54k. The resulting waveform is shown in FIG. 4d. As can be seen from FIG. 4d, evaluation of the milling edge 54k from above results in a relatively large scan angle (e.g. 30° to 50°) of measurement values to the signal strength 15s and to the measurement distance 15a with high signal amplitude. At signal strength 15s, there is a measurement value jump 15ss from h1 to h2 at the position of the milling edge. This jump provides the exact position of the milling edge in relation to the measurement angle (here: α=0 degrees). Decisive in addition to the distance values is the scan angle at which the height jump from h1 to h2 occurs. The distance measurement is used here only to detect the change in distance from h1 to h2. Assuming that the angle α=0 degrees or any angle in the measurement range is taken as the reference value, it is not the distance but the scan angle at which the height jump occurs that has to be kept constant in this application. According to an alternative, the scan angle can also be converted into a distance value (lateral or vertical distance), as can be seen from FIGS. 4e and 4f. In FIG. 4e, the situation of FIG. 4c is shown, wherein, however, the scanner 10 is not arranged vertically above, but laterally offset with respect to the milling edge 54k. Thus, an angle α (angle of the jump) is established. Based on the formula a=tan(α)·h with a equal to the distance and h equal to the height (cf. FIG. 4f), the lateral distance can be determined.

For both the variant of FIG. 4c and the variant of FIG. 4e, the signal pattern from FIG. 4d is relevant for the distance calculation to the reference. If the laser scanner 10 is perpendicular above the milling edge 54s, the zero reference is defined here, i.e. the measurement angle has the value α=0 degrees at this location. If the laser scanner 10 is not perpendicular to the reference (here milling edge 54k with offset to the top right), the measurement angle α changes in relation to the zero reference. The measurement distance to the reference can therefore be calculated in the same way as the tangent value, so that the distance value a determined in this way in the X direction (lateral) represents the distance to the zero reference. While the zero reference is determined in the laser scanner, the laser scanner 10 should be installed during setup so that the distance value a is as close to zero as possible.

Figure 5A:
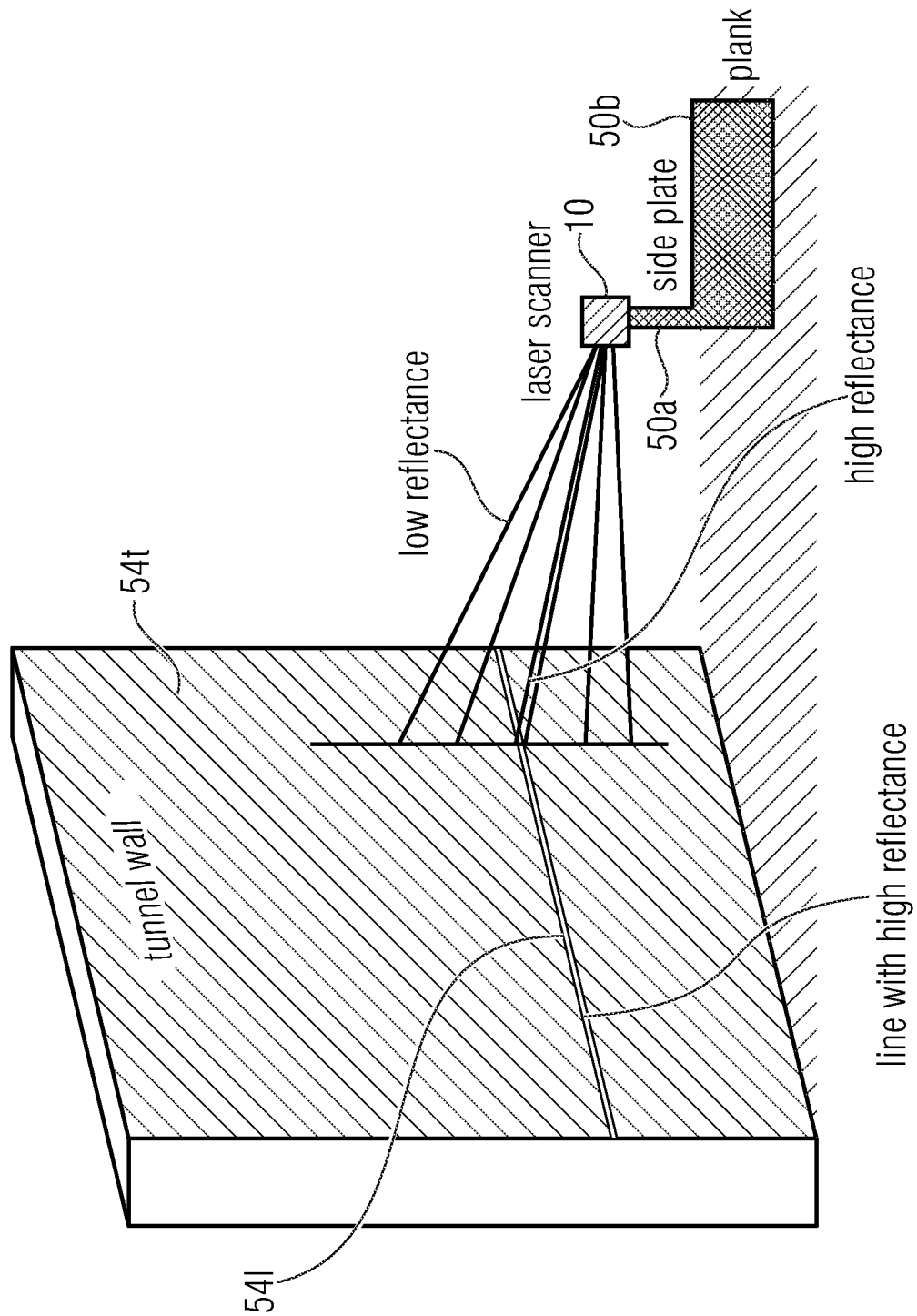

Referring to FIG. 5a, a pattern recognition of a line 541, e.g., on a tunnel wall 54t, is explained below.

FIG. 5a shows a laser scanner arranged on a plank or in the extendable part 50a of the plank 50b, the measurement range of which is oriented such that the same scans the tunnel wall 50t laterally. The reference line 541 attached to the tunnel wall 50t also provides a specific pattern that can be used to unambiguously determine the distance between the reference line 541 and the laser scanner 10. The example described here refers to a bright (for example white) reference line 541 on a dark background (for example a concrete wall 54t). It should be noted merely for completeness that the pattern recognition described can also be used to detect a dark line 541 (for example, black or gray line) on a bright background 54t, in which case a representation of a waveform is substantially reversed.

FIG. 5b shows the waveform of the signal strength 15a and the measurement distance 50a plotted against the measurement angle α. The measurement vector with the highest signal strength 50s is taken as the distance value for reference, since a peak-shaped change (maximum) of the signal strength 15s (cf. reference number 15sp) results from the reflection at the line having the higher reflectance 541. The distance under this measurement angle is taken as the distance measurement value (regardless of whether a maximum of 15a is present here or not).

In the embodiment explained above, it has been assumed that one measurement value was taken to determine the distance or the angle. According to the embodiment, however, the measurement was taken continuously, i.e. over the time during which the road finishing machine can move. In order to take the measurement values into account accordingly, in particular the measurement values taken at the same position, averaging can be performed, as explained below.

Those n measurement values are selected which successively provide approximately the same distance value, and an average value is formed from these measurement values. The calculation is based on the following equation:

$$\overline{\text{distance}} = L = \frac{\sum_{i=0}^{n} l_i}{n}$$

$l_i$=distance value of the respective measurement
i=number of measurements
n=number of successive approximately equal measurements
L=average distance value to the reference contour Since the distance or an angle is now directly or averaged available as a reference, regulation of either the transverse control of the finishing machine or the width control of the plank or also a height leveling of the plank can be carried out on the basis of the determined distance or the determined angle. Therefore, a further embodiment comprises a control apparatus 14 (cf. FIG. 6a), which is configured, for example, to track the extendable part of the plank such that the distance to the reference or the measurement angle with respect to the reference remains constant. As shown in FIG. 6a, the control apparatus 14 obtains the measurement distance to the reference or at the corresponding angle of the evaluation unit 12. According to a further embodiment, a control can be configured to control the road finishing machine such that the distance to the reference remains constant. Consequently, the distance values or angle values in relation to a reference contour are supplied to a steering control, which controls the finishing machine such that the finishing machine performs asphalt paving as parallel as possible to the reference contour. Further, the control can be configured to level the plank, i.e. to regulate or level the plank in its height position.

As shown with reference to FIG. 6a, the laser scanner(s) 10 may be connected to the evaluation unit 12 via a CAN bus, RS232 or Ethernet or the like. Likewise, the evaluation unit can be connected to the control unit 14 via the CAN bus. It should be noted at this point that, for example, the control circuit for the plank can have its own evaluation unit of the control apparatus, like the control circuit for the steering control.

Referring to FIG. 6b, the evaluation unit will be explained in detail. FIG. 6b shows the evaluation unit 12'. The evaluation unit 12' comprises a measurement value filter 12f', which filters the measurement signals incoming from the one or several laser scanners.

According to embodiments, measurement value filtering can be carried out as follows: In the evaluation unit, the individual measurement vectors are first examined for their signal amplitude in a first step. Only those measurement vectors are taken into account that are located in the specified measurement range and also have a high signal amplitude (high reflectance). Low signal amplitudes or a low reflectance is an indication that the measurement value does not belong to the closer scanning range of the reference.

Additionally or alternatively, measurement value filtering can be performed as explained above for averaging across several measurement values in this measurement value filter 12f'.

From the measurement value filter 12f', the measurement values are transferred to the pattern recognition 12m', which then detects an object, such as a milling edge or a rope or a line, as a pattern, as already explained above. Which object is detected as a pattern is determined by means of a user interface, which is illustrated here with reference to block 13b'. The user interface can, for example, be integrated into the control of the road finishing machine. The user interface 13b' is used to select the pattern being searched for and, in particular, to limit the measurement range. This measurement range limitation is performed by means of the measurement range limiter 12mb', which receives its input from the user interface 13b'. The background is that the laser scanners explained above typically cover a rather large angular range and can thus simultaneously detect a taut rope at the level of the laser scanner (19 degrees compared to 10bv of FIG. 6c) as well as a milled edge at a lower angle (e.g. 60 degrees compared to 10bv of FIG. 6c). By means of the measurement range limiter 12mb', the angular range is then narrowed down according to the preselected reference. The limiting takes place, for example, such that the measuring filter f' arranged at the input of the evaluation unit 12' forwards only values with an angular range greater than x1 and less than x2 to the pattern detector 12m'. In addition, the evaluation unit also has a distance calculation unit 12a', which either directly determines a distance to an object based on the distance measurement value (typically evaluation of the run time) or calculates the distance based on a detected angle of the pattern to be searched. The unit 12a' then outputs the distance values to the reference.

According to embodiments, the evaluation unit 12' is configured to detect the reference contour on the basis of the continuously measured distance vectors, and to calculate the distance to the reference. Since all the operations explained above are carried out in digital form in particular, the evaluation unit 12' mainly comprises a microcontroller which receives the measurement vectors from the laser scanner via an interface such as a serial interface (CAN, RS232 or Ethernet or the like).

As already explained above, the evaluation unit 12', in particular starting from the functional blocks 13b' and 12mb' as well as 12m', is configured to detect different reference patterns. This can be done either automatically or optionally also via the input of an operator (cf. functional block 13b'), via which the measurement range (cf. 12mb') is limited.

According to another embodiment, the reference is selected as follows: The laser scanner first scans the possible reference locations (e.g., milling edge, rope, reference line on the wall) and identifies the existing reference or references. If several references (e.g. rope and milling edge) are available, it is up to the user to select the desired reference (rope or milling edge) via a corresponding input. Once a unique reference has been defined, the scanning range for the selected reference is limited so that the sensor is also fixed to the selected reference and no jumping between references can occur. The limitation of the measurement range also has the advantage that the evaluation of the individual measurement vectors is reduced to a minimum, thereby accelerating the evaluation algorithm and considerably suppressing disturbance variables.

In the above embodiment, it has been assumed that the same refer to distance/steering sensors for road finishing machines. Since a sensor system is explained here, the same can obviously also be used for other machines, such as other construction machines, e.g. a grader or a compaction roller. In the case of a grader, either the steering or also the positioning of the movable tool transverse to the direction of travel (analogous to positioning of the plank or width control of the plank) or also a height leveling of the tool is monitored and/or controlled with the system explained above. In this respect, the apparatus is suitable for determining the position of the overall vehicle (construction machine in general), in particular transverse to the direction of travel for steering purposes and/or for determining the position as well as leveling the movable/extendable mold (transverse to the direction of travel) for controlling the tool. At this point, it should be pointed out once again that a particular advantage of all the implementations explained above is that one and the same laser sensor can be used for different purposes, namely one as a steering sensor directly on the finishing machine or construction machine and another time as a sensor for the plank or generally for extendable machine parts, as well as a sensor in use for height leveling of the plank, regardless of whether the reference to be searched for is located laterally, obliquely laterally or at the bottom. The measurement range or potential location of the object to be detected is determined by the orientation of the measurement sensor and/or by the limitation of the measurement range. Viewed from another side, the measurement system or measurement and control system explained here provides the basis for autonomous driving of construction machines.

Even though it has been assumed in embodiments that these are all implemented as an apparatus, it should be noted here that a further embodiment refers to a corresponding method, which can be executed on the microcontroller of the evaluation means 12', for example. The method comprises the basic steps of recognizing a pattern (automatically or depending on a user input). Pattern recognition is performed according to embodiments as explained above and, depending on the exact implementation, the same can detect laterally arranged patterns, such as a rope or even a line, as well as laterally obliquely arranged patterns, such as a milling edge. Further, the method of pattern recognition can also comprise steps of detecting a rope or a milling edge from above.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

The apparatuses described herein may be implemented, for example, by using a hardware apparatus or by using a computer or by using a combination of a hardware apparatus and a computer.

The apparatuses described herein or any components of the apparatuses described herein may be implemented at least partly in hardware and/or software (computer program).

The methods described herein may be implemented, for example, by using a hardware apparatus or by using a computer or by using a combination of a hardware apparatus and a computer.

The methods described herein or any components of the methods described herein may be performed at least partly by hardware and/or by software (computer program).

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Sensor system for a construction machine, in particular a road finishing machine, comprising:
    a first laser scanner that can be arranged on the construction machine and is configured to search a specified angular range for objects and to determine corresponding distance values, which describe the distance to the one or several objects, together with corresponding intensity values, which describe an intensity of a reflection resulting at the one or several objects, across angles of the specified angular range,
    an evaluation unit configured to detect an object as a reference together with an associated angle starting from a known pattern comprising the distance values and the intensity values across scanning angles, and configured to determine a distance to the reference and the angle with respect to the reference;
    wherein the evaluation unit is configured for being operated in a lateral perspective mode and in a bird's eye view mode.

2. Sensor system according to claim 1, wherein the distance to the reference to be determined is a lateral distance a between the laser scanner and the reference.

3. Sensor system according to claim 1, wherein the evaluation unit is configured to determine a plurality of n distance values over a time or distance traveled or to determine a plurality of n distance values over a time or distance traveled and to determine the n distance values using the following formula:

$$\overline{\text{distance}} = L = \frac{\sum_{i=0}^{n} li}{n}$$

wherein $l_i$ is the distance value of the respective measurement, i is the number of measurements, n is the number of successive measurements, and L is the average distance value to the reference.

4. Construction machine, in particular road finishing machine with a sensor system according to claim 1.

5. Sensor system according to claim 1, wherein the evaluation unit is configured to detect different types of the objects as a reference based on different known patterns.

6. Sensor system according to claim 5, wherein the evaluation unit receives a user selection characterizing the type of object to be detected via a user interface.

7. Sensor system according to claim 1, wherein the object to be detected is a rope.

8. Sensor system according to claim 7, wherein the evaluation unit detects the rope when there is a maximum of the intensity values in the form of a peak and when there is a minimum of the distance values in the form of a peak or when there is a maximum of the intensity values in the form of a peak and a minimum of the distance values in the form of a peak at the same angle in the specified angular range.

9. Sensor system according to claim 7, wherein the evaluation unit is configured to detect the rope from a bird's-eye view and to determine the angle a in the specified angular range or to detect the rope from a bird's-eye view and to determine the angle $\alpha$ in the specified angular range in order to calculate the distance a starting from the determined angle $\alpha$ using the formula a=tan $\alpha$·height h.

10. Sensor system according to claim 7, wherein the evaluation unit is configured to detect the rope in a lateral perspective and to determine the distance to the rope.

11. Sensor system according to claim 1, wherein the evaluation unit is configured to detect an edge, in particular a milling edge or curb edge.

12. Sensor system according to claim 11, wherein the evaluation unit determines the edge in a lateral perspective if the intensity values form a superelevation under an angular range of the specified angular range, or if the distance values form a plateau of the distance values under an angular range of the specified angular range, or if there is a combination of a plateau of the distance values and a superelevation of the intensity values in an angular range of the specified angular range.

13. Sensor system according to claim 11, wherein the evaluation unit determines the edge in a bird's eye view when the distance values form a jump at an angle of the specified angular range or when the distance values form a maximum at an angle of the specified angular range or when the distance values form a jump at an angle of the specified angular range and the distance values form a maximum at the angle of the specified angular range.

14. Sensor system according to claim 13, wherein the evaluation unit is configured to determine the distance a with the formula a=tan $\alpha$·height h starting from the determined angle of the angular range.

15. Sensor system according to claim 1, wherein the evaluation unit is configured to detect a line in a lateral perspective on a wall or in a bird's eye view on a ground.

16. Sensor system according to claim 15, wherein the line is detected when a maximum of the intensity values in the form of a peak is acquired at an angle of the specified angular range in combination with a continuously varying distance value.

17. Sensor system according to claim 1, wherein the sensor system comprises a control configured to control the steering of the construction machine starting from the distance to the reference and/or the angle with respect to the reference, or configured to control the steering starting from distance to the reference and/or the angle with respect to the reference, taking into account the distances of the laser scanners from a machine fixed point of the construction machine.

18. Sensor system according to claim 17, wherein the first laser scanner or the first laser scanner and a second laser scanner are arranged laterally in the area of a front side of the construction machine or laterally on a side of the road finishing machine opposite with respect to a plank of the road finishing machine.

19. Sensor system according to claim 1, wherein the first laser scanner can be arranged on an extendable part of a plank of the road finishing machine.

20. Sensor system according to claim 19, wherein the sensor system comprises a control configured to control the extendable parts of the plank or the plank starting from the distance to the reference and/or the angle with respect to the reference, or configured to control the extendable parts of the plank or the plank starting from the distance from the reference and/or the angle with respect to the reference, taking into account the distances of the first and second laser scanners to a machine fixed point of the construction machine.

21. Sensor system according to claim 1, wherein the sensor system further comprises a second or second, third and fourth laser scanners and wherein the first laser scanner is arranged on the road finishing machine on a first side and the second laser scanner is arranged on the extendable part of the plank on the first side.

22. Sensor system according to claim 21, wherein the sensor system comprises a control configured to control the extendable parts of the plank or the plank starting from the vertical distance to the reference, or configured to control the extendable parts of the plank or the plank starting from the vertical distance to the reference, taking into account the distances of the first and second laser scanner to a machine fixed point of the construction machine.

23. Method for determining a distance to a reference and/or an angle with respect to the reference using a first laser scanner arranged on the construction machine and configured to search a specified angular range for objects and to determine corresponding distance values, which describe the distance to the one or several objects, together with corresponding intensity values, which describe an intensity of a reflection resulting at the one or several objects, across angles of the specified angular range, comprising:
   detecting an object as a reference together with an associated angle starting from a known pattern comprising the distance values and the intensity values across scanning angles, and
   determining a distance to the reference and the angle with respect to the reference;
   wherein said scanner is configured for being operated in a lateral perspective mode and in a bird's eye view mode.

24. Method according to claim 23, further comprising controlling the construction machine or a component of the construction machine depending on the distance to the reference and/or the angle with respect to the reference.

25. A non-transitory digital storage medium having a computer program stored thereon to perform a method for determining a distance to a reference and/or an angle with respect to the reference using a first laser scanner arranged on the construction machine and configured to search a specified angular range for objects and to determine corresponding distance values, which describe the distance to the one or several objects, together with corresponding intensity values, which describe an intensity of a reflection resulting at the one or several objects, across angles of the specified angular range, the method comprising:
   detecting an object as a reference together with an associated angle starting from a known pattern comprising the distance values and the intensity values across scanning angles, and
   determining a distance to the reference and the angle with respect to the reference;
   wherein said scanner is configured for being operated in a lateral perspective mode and in a bird's eye view mode,
   when said computer program is run by a computer.

* * * * *